US012806900B2

(12) United States Patent
Asami

(10) Patent No.: US 12,806,900 B2
(45) Date of Patent: Nov. 24, 2026

(54) LIQUID EJECTING APPARATUS

(71) Applicant: SEIKO EPSON CORPORATION, Tokyo (JP)

(72) Inventor: Masahiro Asami, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 36 days.

(21) Appl. No.: 19/065,273

(22) Filed: Feb. 27, 2025

(65) Prior Publication Data

US 2025/0276517 A1 Sep. 4, 2025

(30) Foreign Application Priority Data

Feb. 29, 2024 (JP) ................................ 2024-029631

(51) Int. Cl.
*B41J 2/045* (2006.01)
*B41J 2/14* (2006.01)

(52) U.S. Cl.
CPC ....... *B41J 2/04588* (2013.01); *B41J 2/04541* (2013.01); *B41J 2/04573* (2013.01); *B41J 2/04581* (2013.01); *B41J 2/04593* (2013.01); *B41J 2/04596* (2013.01); *B41J 2/14233* (2013.01)

(58) Field of Classification Search
CPC ................ B41J 2/04588; B41J 2/04541; B41J 2/04573; B41J 2/04581; B41J 2/04593; B41J 2/04596; B41J 2/14233
See application file for complete search history.

(56) References Cited

U.S. PATENT DOCUMENTS

| | | | | |
|---|---|---|---|---|
| 6,488,349 | B1 * | 12/2002 | Matsuo ................ | B41J 2/04581 347/11 |
| 2012/0306954 | A1 * | 12/2012 | Nishikawa ........... | B41J 2/04516 347/11 |
| 2014/0125722 | A1 * | 5/2014 | Otokita .................. | B41J 2/0451 347/11 |
| 2017/0165964 | A1 | 6/2017 | Misawa et al. | |
| 2024/0239100 | A1 | 7/2024 | Asami | |

FOREIGN PATENT DOCUMENTS

| | | | |
|---|---|---|---|
| EP | 3736136 | B1 | 2/2023 |
| JP | 2017-140761 | A | 8/2017 |
| JP | 2024-099183 | A | 7/2024 |

* cited by examiner

*Primary Examiner* — Henok D Legesse
(74) *Attorney, Agent, or Firm* — Harness, Dickey & Pierce, P.L.C.

(57) ABSTRACT

In a liquid ejecting apparatus, a drive signal includes a plurality of ejection pulses corresponding to a plurality of droplets that are combined before landing on a medium. The plurality of ejection pulses has filling elements and ejection elements. The ejection element of a first ejection pulse changes in electrical potential from a first electrical potential to a reference electrical potential. The ejection element of the last ejection pulse changes in electrical potential from a second electrical potential to a third electrical potential. The reference electrical potential is between the first electrical potential and the third electrical potential and between the second electrical potential and the third electrical potential. A time period from the start of the filling element of the last ejection pulse to the start of the ejection element of the last ejection pulse is greater than or equal to 0.3 TC and less than 0.5 TC.

10 Claims, 28 Drawing Sheets

LIQUID EJECTING APPARATUS

The present application is based on, and claims priority from JP Application Serial Number 2024-029631, filed Feb. 29, 2024, the disclosure of which is hereby incorporated by reference herein in its entirety.

BACKGROUND

1. Technical Field

The present disclosure relates to a liquid ejecting apparatus.

2. Related Art

A liquid ejecting apparatus represented by an ink jet type printer generally includes a liquid ejecting head that ejects liquid such as ink. The liquid ejecting head includes a nozzle from which liquid is ejected onto a medium, a pressure chamber communicating with the nozzle, and a drive element such as a piezoelectric element that causes pressure applied to the liquid in the pressure chamber to fluctuate in accordance with a drive signal.

JP-A-2017-140761 discloses a technique in which, in a liquid ejecting apparatus, a plurality of droplets ejected from a nozzle are combined and land on a printing medium in order to, for example, increase the size of a dot formed on the printing medium.

Specifically, the piezoelectric element is driven in accordance with a change in a drive voltage Va, and thus a droplet is ejected from the nozzle. When a predetermined period elapses after the ejection of the droplet, the piezoelectric element is driven in accordance with a change in a drive voltage Vb, and thus another droplet is ejected from the nozzle. Then, the other droplet ejected later catches up with the droplet ejected earlier, and the combined liquid lands on the medium.

FIG. 28 is a diagram illustrating a drive signal Comx according to an existing technique. The drive signal Comx illustrated in FIG. 28 includes a plurality of ejection pulses Px in a single driving cycle Tux. Droplets of ink are ejected based on each of the ejection pulses Px, and a combined droplet obtained by combining the plurality of droplets lands on a medium. Each of the ejection pulses Px included in the drive signal Comx illustrated in FIG. 28 includes a waveform of an electrical potential that changes from a reference electrical potential E0*x* to a lowest electrical potential Emin, then changes to a highest electrical potential Emax, and returns to the reference electrical potential E0*x*. Each of the ejection pulses Px is a so-called pull-push-pull waveform.

However, when the drive signal Comx is used, and a time interval between the plurality of ejection pulses Px is reduced in order to shorten a time interval between times when the ink is ejected by high-speed driving, there is a problem that it is not possible to secure a sufficient time period for damping the remaining vibration of the ink in the nozzle after the ejection and that it is difficult to stably eject the ink.

SUMMARY

According to an aspect of the present disclosure, in order to solve the above-described problem, a liquid ejecting apparatus includes: an ejection section that includes a nozzle from which liquid is ejected onto a medium, a pressure chamber communicating with the nozzle, and a drive element that causes pressure applied to the liquid in the pressure chamber to fluctuate when a drive signal is supplied to the drive element; and a drive signal generator that generates the drive signal. The drive signal includes a first common drive signal including a plurality of ejection pulses corresponding to a plurality of droplets that are combined before the droplets land on the medium. The plurality of ejection pulses include filling elements that change an electrical potential to drive the drive element so as to generate negative pressure in the pressure chamber, and ejection elements that change the electrical potential to drive the drive element to generate positive pressure in the pressure chamber such that a droplet is ejected from the nozzle. An ejection element of a first ejection pulse in chronological order among the plurality of ejection pulses changes in electrical potential from a first electrical potential to a reference electrical potential and is coupled to a first coupling element. A filling element of a last ejection pulse in chronological order among the plurality of ejection pulses changes in electrical potential from an electrical potential equal to or higher than the reference electrical potential to a second electrical potential, and an ejection element of the last ejection pulse changes in electrical potential from the second electrical potential to a third electrical potential. The last ejection pulse includes a damping element that reduces a fluctuation in the pressure in the pressure chamber by changing in electrical potential after the ejection element of the last ejection pulse. The reference electrical potential is between the first electrical potential and the third electrical potential. The reference electrical potential is between the second electrical potential and the third electrical potential. A time period from start of the filling element of the last ejection pulse to start of the ejection element of the last ejection pulse is greater than or equal to 0.3 TC and less than 0.5 TC. TC indicates a natural vibration period of the ejection section.

DESCRIPTION OF EMBODIMENTS

Figure 1:
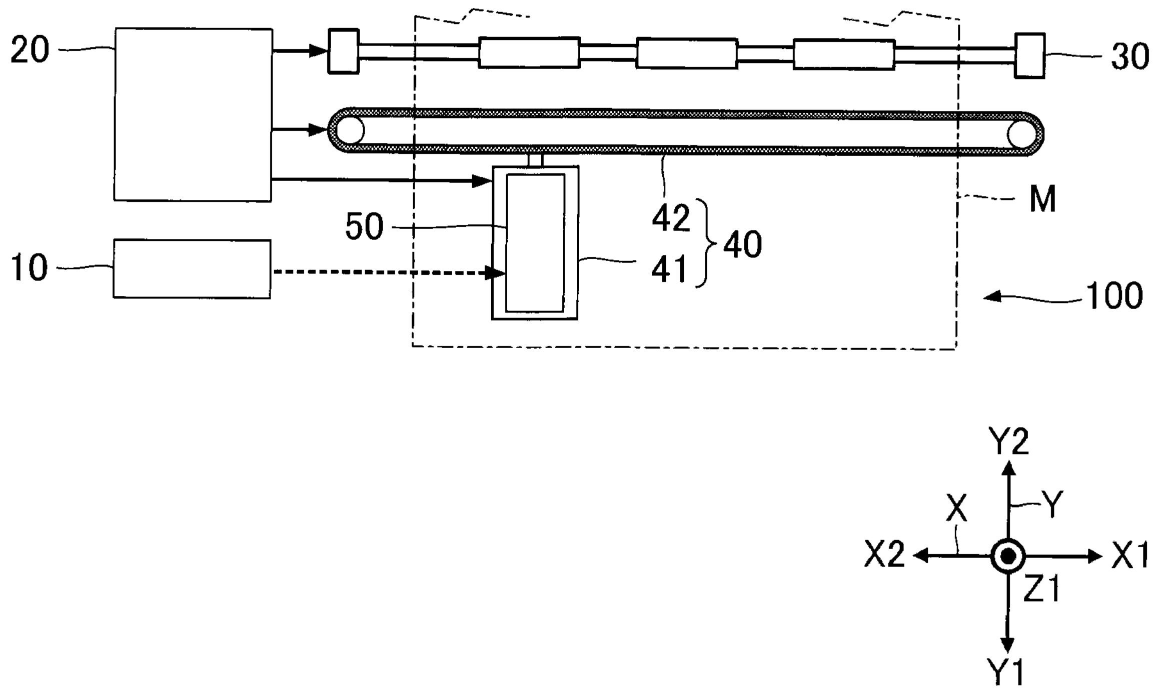
FIG. 1 is a schematic diagram illustrating an example of a configuration of a liquid ejecting apparatus according to a first embodiment.

Hereinafter, preferred embodiments according to the present disclosure will be described with reference to the attached drawings. In the drawings, the size and scale of each portion or section are different from the actual size and scale of each portion or section as appropriate, and some portions or sections are schematically illustrated to facilitate understanding. The scope of the present disclosure is not limited to these embodiments unless otherwise stated to limit the disclosure in the following description.

The following description is made using an X axis, a Y axis, and a Z axis that intersect each other as appropriate. In the following description, one direction along the X axis is an X1 direction, and a direction opposite to the X1 direction is an X2 direction. Similarly, directions opposite to each other along the Y axis are a Y1 direction and a Y2 direction. Directions opposite to each other along the Z axis are a Z1 direction and a Z2 direction.

Typically, the Z axis is a vertical axis, and the Z2 direction corresponds to a downward direction in a vertical direction. The Z axis may be rather than the vertical axis. The X axis, the Y axis, and the Z axis are typically perpendicular to each other, but are not limited thereto. For example, the X axis, the Y axis, and the Z axis may intersect each other at an angle of 80° or greater and 100° or less.

A. First Embodiment

A1. Overall Configuration of Liquid Ejecting Apparatus

FIG. 1 is a schematic diagram illustrating an example of a configuration of a liquid ejecting apparatus 100 according to a first embodiment. The liquid ejecting apparatus 100 illustrated in FIG. 1 is an ink jet type printing apparatus which ejects liquid such as ink onto a medium M as a droplet. The medium M is, for example, a printing sheet. The medium M is not limited to the printing sheet and may be, for example, a printing target of any material such as a resin film or fabric.

As illustrated in FIG. 1, the liquid ejecting apparatus 100 includes a liquid container 10, a control unit 20, a transport mechanism 30, a moving mechanism 40, and a head 50.

The liquid container 10 stores ink. Specific aspects of the liquid container 10 include, for example, a cartridge that can be attached to and detached from the liquid ejecting apparatus 100, a bag-shaped ink pack formed of a flexible film, and an ink tank that can be refilled with ink. A type of the ink stored in the liquid container 10 is optional.

The control unit 20 controls an operation of each element of the liquid ejecting apparatus 100. The control unit 20 includes, for example, one or a plurality of processing circuits such as a central processing unit (CPU) or a field-programmable gate array (FPGA), and one or a plurality of storage circuits such as a semiconductor memory.

The transport mechanism 30 transports the medium M in the Y1 direction under control by the control unit 20. The moving mechanism 40 causes the head 50 to reciprocate along the X axis under control by the control unit 20. The moving mechanism 40 includes a substantially box-shaped carriage 41 storing the head 50, and an endless transport belt 42 to which the carriage 41 is fixed. The number of heads 50 mounted on the carriage 41 is not limited to one, and may be two or more. Further, the liquid container 10 described above may be mounted on the carriage 41 in addition to the head 50.

The head 50 ejects the ink supplied from the liquid container 10 onto the medium M from each of a plurality of nozzles under control by the control unit 20. The ejection is performed in parallel with the transport of the medium M by the transport mechanism 30 and the reciprocating movement of the head 50 by the moving mechanism 40, and thus an image is formed on a surface of the medium M by the ink.

A2. Electrical Configuration of Liquid Ejecting Apparatus

Figure 2:
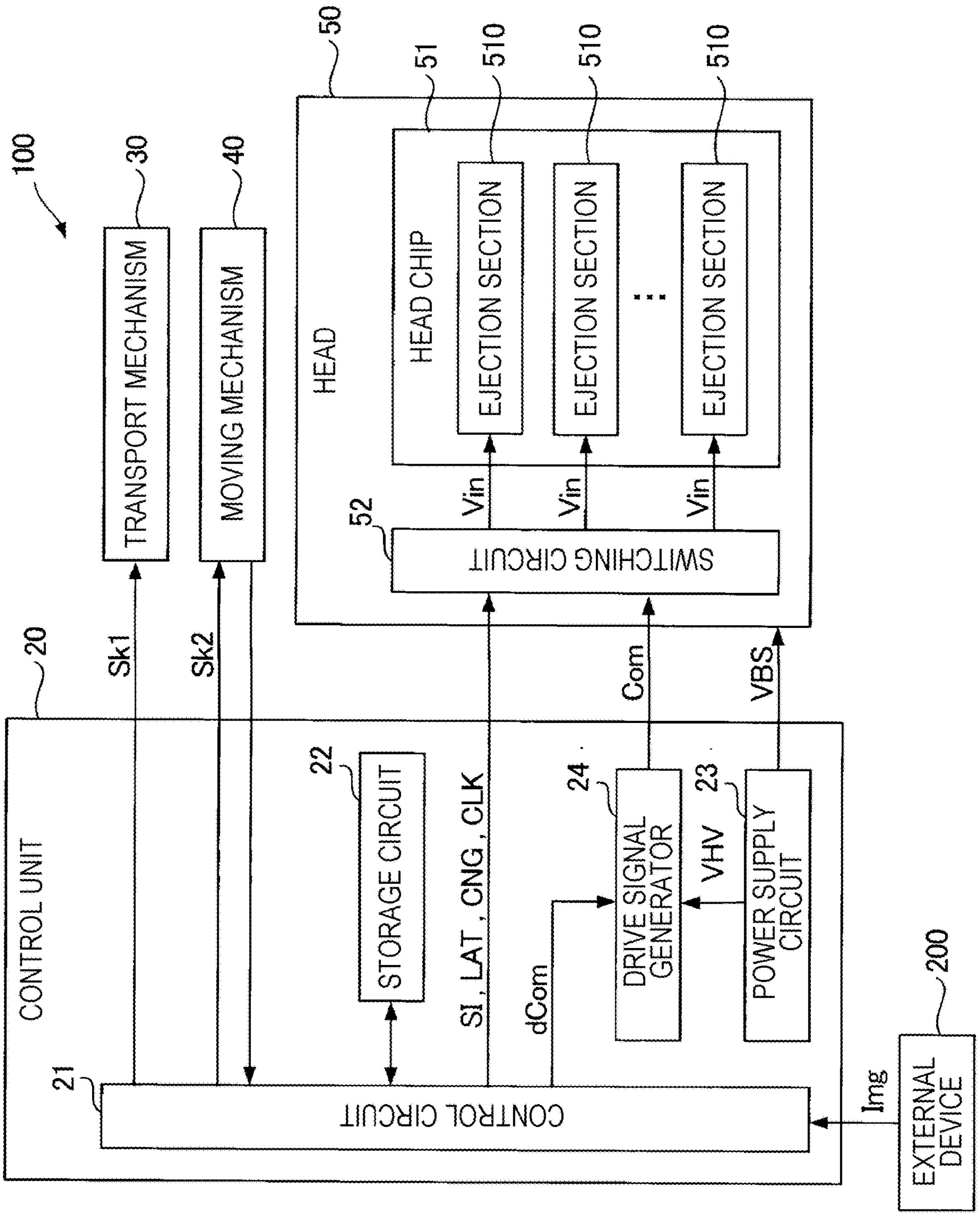
FIG. 2 is a diagram illustrating an electrical configuration of the liquid ejecting apparatus according to the first embodiment.

FIG. 2 is a diagram illustrating an electrical configuration of the liquid ejecting apparatus 100 according to the first embodiment. As illustrated in FIG. 2, the head 50 includes a head chip 51 and a switching circuit 52.

The head chip 51 includes a plurality of ejection sections 510. The switching circuit 52 switches whether or not to supply, as a supply signal Vin, at least a portion of a common drive signal Com output from the control unit 20 to each of the plurality of ejection sections 510 included in the head chip 51 under control by the control unit 20.

In the example illustrated in FIG. 2, the head chip 51 includes M ejection sections 510. M is a natural number of 1 or more. Hereinafter, an m-th ejection section 510 among the M ejection sections 510 may be referred to as an ejection section 510*m*. m is a natural number satisfying "1≤m≤M". Hereinafter, when a constituent element, a signal, or the like of the head 50 corresponds to the ejection section 510*m* among the M ejection sections 510, a suffix m may be added to a reference sign for representing the constituent element, the signal, or the like.

The control unit 20 includes a control circuit 21, a storage circuit 22, a power supply circuit 23, and a drive signal generator 24.

The control circuit 21 has a function of controlling an operation of each section of the liquid ejecting apparatus 100 and a function of processing various data. The control circuit 21 includes, for example, a processor such as one or more central processing units (CPUs). The control circuit 21 may include a programmable logic device such as a field-programmable gate array (FPGA) instead of or in addition to the one or more CPUs. In addition, when the control circuit 21 includes a plurality of processors, the plurality of processors may be mounted on different substrates or the like.

The storage circuit 22 stores various programs to be executed by the control circuit 21 and various data such as print data Img to be processed by the control circuit 21. The storage circuit 22 includes, for example, one or both of a semiconductor memory that is a volatile memory such as a random-access memory (RAM) and a semiconductor memory that is a non-volatile memory such as a read-only memory (ROM), an electrically erasable programmable read-only memory (EEPROM), or a programmable ROM (PROM). The print data Img is supplied from an external device 200 such as a personal computer or a digital camera. The storage circuit 22 may be configured as a portion of the control circuit 21.

The power supply circuit 23 receives power supplied from a commercial power supply (not illustrated) and generates various predetermined electrical potentials. The generated various electrical potentials are appropriately supplied to each section of the liquid ejecting apparatus 100. For example, the power supply circuit 23 generates a power supply electrical potential VHV and an offset electrical potential VBS. The offset electrical potential VBS is supplied to the head 50. The power supply electrical potential VHV is supplied to the drive signal generator 24.

The drive signal generator 24 is a circuit that generates the common drive signal Com. Specifically, the drive signal generator 24 includes, for example, a DA conversion circuit and an amplifying circuit. In the drive signal generator 24, the DA conversion circuit converts a waveform specifying signal dCom from the control circuit 21 from a digital signal to an analog signal, and the amplifying circuit amplifies the analog signal using the power supply electrical potential VHV from the power supply circuit 23, thereby generating the common drive signal Com. A signal of a waveform actually supplied to the ejection sections 510 and included in a waveform included in the common drive signal Com is the supply signal Vin described above. The waveform specifying signal dCom is a digital signal for defining the waveform of the common drive signal Com.

The control circuit 21 executes a program stored in the storage circuit 22 to control the operation of each section of the liquid ejecting apparatus 100. In this case, the control circuit 21 generates control signals Sk1 and Sk2, a print data signal SI, the waveform specifying signal dCom, a latch signal LAT, a change signal CNG, and a clock signal CLK by executing the program, as signals for controlling the operation of each section of the liquid ejecting apparatus 100.

The control signal Sk1 is a signal for controlling the driving of the transport mechanism 30. The control signal Sk2 is a signal for controlling the driving of the moving mechanism 40. The print data signal SI is a digital signal for specifying an operation state of each of the ejection sections 510. The latch signal LAT and the change signal CNG are timing signals that are used together with the print data signal SI to define a timing at which ink is ejected from each of the nozzles included in the head chip 51. These timing signals are generated, for example, based on output of an encoder that detects the position of the carriage 41 described above.

A3. Specific Structure of Head Chip

Figure 3:
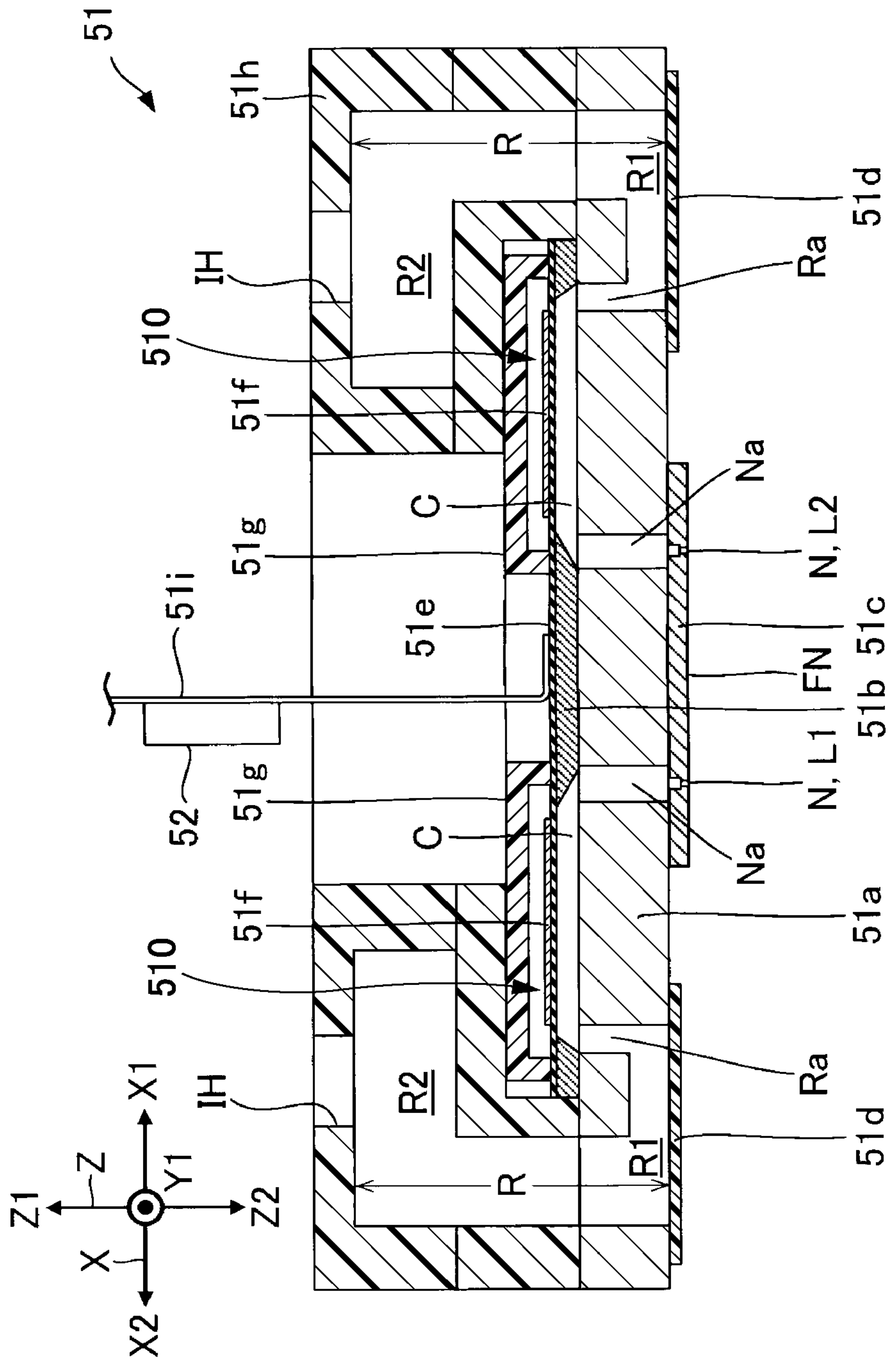
FIG. 3 is a cross-sectional view illustrating an example of a head chip.

FIG. 3 is a cross-sectional view illustrating an example of the head chip 51. As illustrated in FIG. 3, the head chip 51 includes the plurality of nozzles N arranged in the direction along the Y axis. Ink is ejected from each of the nozzles N and lands on the medium M. The plurality of nozzles N are divided into a first row L1 and a second row L2 which are arranged at an interval in the direction along the X axis. Each of the first row L1 and the second row L2 is a set of a plurality of nozzles N linearly arranged in the direction along the Y axis.

The head chip 51 has a substantially symmetrical configuration in the direction along the X axis. The positions of the plurality of nozzles N of the first row L1 in the direction along the Y axis may match or may be different from the positions of the plurality of nozzles N of the second row L2 in the direction along the Y axis. FIG. 3 illustrates a configuration in which the positions of the plurality of nozzles N in the first row L1 in the direction along the Y axis match the positions of the plurality of nozzles N in the second row L2 in the direction along the Y axis.

As illustrated in FIG. 3, the head chip 51 includes a flow path substrate 51*a*, a pressure chamber substrate 51*b*, a nozzle plate 51*c*, a vibration absorbing body 51*d*, a vibration plate 51*e*, a plurality of drive elements 51*f*, a protective plate 51*g*, a case 51*h*, and a wiring substrate 51*i*.

The flow path substrate 51*a* and the pressure chamber substrate 51*b* are stacked in this order in the Z1 direction, and form a flow path for supplying the ink to the plurality of nozzles N. The vibration plate 51*e*, the plurality of drive elements 51*f*, the protective plate 51*g*, the case 51*h*, and the wiring substrate 51*i* are disposed in a region located in the Z1 direction with respect to a stacked body formed by the flow path substrate 51*a* and the pressure chamber substrate 51*b*. On the other hand, the nozzle plate 51*c* and the vibration absorbing body 51*d* are disposed in a region located in the Z2 direction with respect to the stacked body. Each of the elements of the head chip 51 is schematically a plate-shaped member elongated in the Y direction, and the elements of the head chip 51 are bonded to each other by, for example, an adhesive.

The nozzle plate 51*c* is a plate-shaped member provided with the plurality of nozzles N in each of the first row L1 and the second row L2. Each of the plurality of nozzles N is a through-hole through which the ink passes. In this case, a surface of the nozzle plate 51*c* facing the Z2 direction is a nozzle surface FN. The nozzle plate 51*c* is manufactured by processing a silicon single crystal substrate by using a semiconductor manufacturing technique using a processing technique such as dry etching or wet etching, for example. However, other known methods and materials may be appropriately used for manufacturing the nozzle plate 51*c*. Further, the cross-sectional shape of each of the nozzles is typically a circular shape, but is not limited thereto, and may be a non-circular shape such as a polygon or an ellipse.

The flow path substrate 51*a* is provided with a space R1, a plurality of supply flow paths Ra, and a plurality of communication flow paths Na for each of the first row L1 and the second row L2. The space R1 is an elongated opening extending in the direction along the Y axis in plan view from the direction along the Z axis. Each of the supply flow paths Ra and the communication flow paths Na is a through-hole formed for each of the nozzles N. Each of the supply flow paths Ra communicates with the space R1.

The pressure chamber substrate 51*b* is a plate-shaped member provided with a plurality of pressure chambers C for each of the first row L1 and the second row L2. The pressure chambers C are also referred to as cavities. The plurality of pressure chambers C are arranged in the direction along the Y axis. Each of the pressure chambers C is formed for a respective one of the nozzles N and is an elongated space extending in the direction along the X axis in plan view. Each of the flow path substrate 51*a* and the pressure chamber substrate 51*b* is manufactured by processing a silicon single crystal substrate by using, for example, a semiconductor manufacturing technique in a similar manner to the nozzle plate 51*c* described above. In addition, other known methods and materials may be appropriately used for manufacturing each of the flow path substrate 51*a* and the pressure chamber substrate 51*b*.

The pressure chambers C are spaces located between the flow path substrate 51*a* and the vibration plate 51*e*. For each of the first row L1 and the second row L2, a plurality of pressure chambers C are arranged in the direction along the Y axis. Each of the pressure chambers C communicates with a respective one of the communication flow paths Na and a respective one of the supply flow paths Ra. Therefore, the pressure chambers C communicate with the nozzles N through the communication flow paths Na and communicate with the space R1 through the supply flow paths Ra.

The vibration plate 51*e* is disposed on a surface of the pressure chamber substrate 51*b* facing the Z1 direction. The vibration plate 51*e* is a plate-like member that can elastically vibrate. The vibration plate 51*e* has, for example, a first layer and a second layer, which are stacked in the Z1 direction in this order. The first layer is, for example, an elastic film made of silicon oxide ($SiO_2$). The elastic film is formed by, for example, thermally oxidizing one surface of a silicon single crystal substrate. The second layer is, for example, an insulating film made of zirconium oxide ($ZrO_2$). The insulating film is formed by, for example, forming a zirconium layer using a sputtering method and thermally oxidizing the layer. The vibration plate 51*e* is not limited to the above-described stacked configuration with the first layer and the second layer, and may be constituted by, for example, a single layer or three or more layers.

The plurality of drive elements 51*f* corresponding to the nozzles N are disposed on a surface of the vibration plate 51*e* facing the Z1 direction. When the supply signal Vin generated from the common drive signal Com is supplied to each of the drive elements 51*f*, the drive elements 51*f* cause fluctuations in the pressure applied to the ink in the pressure chambers C. Each of the drive elements 51*f* has an elongated shape extending in the direction along the X axis in plan view. The plurality of drive elements 51*f* are arranged in the direction along the Y axis to correspond to the plurality of pressure chambers C. The drive elements 51*f* overlap the pressure chambers C in plan view.

Each of the drive elements 51*f* is a piezoelectric element. Although not illustrated, each of the drive elements 51*f* has a first electrode, a piezoelectric layer, and a second electrode, which are stacked in the Z1 direction in this order. Either the first electrodes or the second electrodes are individual electrodes spaced apart from each other for each of the drive elements 51*f*. The supply signal Vin is applied to the individual electrodes. The other electrodes out of the first electrodes and the second electrodes are a band-shaped common electrode extending in the direction along the Y axis so as to be continuous over the plurality of drive elements 51*f*. The offset electrical potential VBS is supplied to the other electrodes. Examples of a metal material of these electrodes include metal materials such as platinum (Pt), aluminum (Al), nickel (Ni), gold (Au), and copper (Cu). Among the metal materials, one type can be used alone, or two or more types can be used in combination in the form of an alloy, stacked layers, or the like. Each of the piezoelectric layers is formed of a piezoelectric material such as lead zirconate titanate ($Pb(Zr, Ti)O_3$) and has, for example, a band shape extending in the direction along the Y axis so as to be continuous over the plurality of drive elements 51*f*. However, the piezoelectric layers may be integrated over the plurality of drive elements 51*f*. In this case, in each of the piezoelectric layers, in a region corresponding to a gap between the pressure chambers C adjacent to each other in plan view, a through-hole penetrating the piezoelectric layer is provided to extend in the direction along the X axis. When the vibration plate 51*e* vibrates in conjunction with the deformation of the drive elements 51*f*, the pressure in the pressure chambers C fluctuates, and thus the ink is ejected from the nozzles N.

The protective plate 51*g* is a plate-shaped member disposed on the surface of the vibration plate 51*e* facing the Z1 direction, protects the plurality of drive elements 51*f*, and reinforces the mechanical strength of the vibration plate 51*e*. The plurality of drive elements 51*f* are stored between the protective plate 51*g* and the vibration plate 51*e*. The protective plate 51*g* is made of, for example, a resin material.

The case 51*h* is a member for storing the ink to be supplied to the plurality of pressure chambers C. The case 51*h* is made of, for example, a resin material. The case 51*h* is provided with spaces R2 for each of the first row L1 and the second row L2. The spaces R2 communicate with the space R1 and function as reservoirs R for storing the ink to be supplied to the plurality of pressure chambers C together with the space R1. The case 51*h* is provided with an inlet IH for supplying the ink to each of the reservoirs R. The ink in each of the reservoirs R is supplied to the pressure chambers C through each of the supply flow paths Ra.

The vibration absorbing body 51*d* is also referred to as a compliance substrate. The vibration absorbing body 51*d* is a flexible plastic film that forms wall surfaces of the reservoirs R and reduces fluctuations in the pressure applied to the ink in the reservoirs R. The vibration absorbing body 51*d* may be a thin plate made of metal and having flexibility. A surface of the vibration absorbing body 51*d* facing the Z1 direction is bonded to the flow path substrate 51*a* by an adhesive or the like.

The wiring substrate 51*i* is a mounting component which is mounted on the surface of the vibration plate 51*e* facing the Z1 direction and electrically couples the control unit 20 and the head chip 51. The wiring substrate 51*i* is, for example, a flexible wiring substrate such as a chip on film (COF), a flexible printed circuit (FPC), or a flexible flat cable (FFC). The switching circuit 52 for supplying a drive voltage to each of the drive elements 51*i* is mounted on the wiring substrate 51*f* according to the present embodiment.

In the head chip 51 having the above-described configuration, the ejection sections 510 include at least the nozzles N, the pressure chambers C, and the drive elements 51*f*. In the present embodiment, the ejection sections 510 include portions included in the nozzles N, the pressure chambers C, the supply flow paths Ra, the communication flow paths Na, the drive elements 51*f*, and the vibration plate 51*e* and involved in an operation of ejecting the ink from the nozzles N by the driving of the drive elements 51*f*.

A4. Driving of Drive Elements 51*f*

Figure 4:
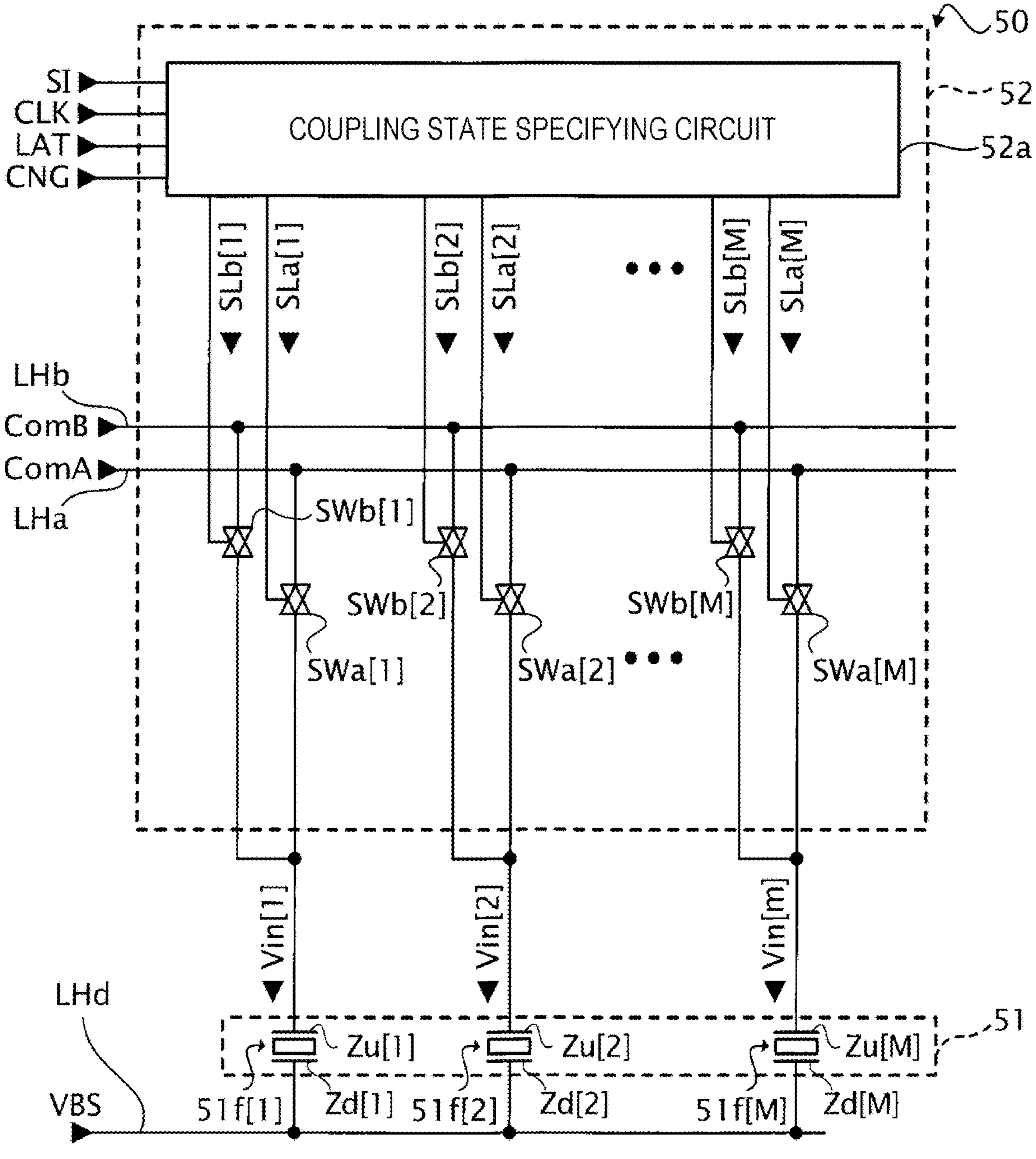
FIG. 4 is a diagram for explaining a switching circuit.

FIG. 4 is a diagram for explaining the switching circuit 52. The drive elements 51*f* are driven by the supply signal Vin from the switching circuit 52.

As illustrated in FIG. 4, wiring LHa and wiring LHb are coupled to the switching circuit 52. In the present embodiment, a first common drive signal ComA and a second common drive signal ComB are exemplified as the common drive signal Com. The wiring LHa is a signal line through which the first common drive signal ComA is transmitted. The wiring LHb is a signal line through which the second common drive signal ComB is transmitted. FIG. 4 illustrates one of the first electrode and the second electrode of each of the drive elements 51*f* as an electrode Zd[m] and the other of the first electrode and the second electrode of each of the drive elements 51*f* as an electrode Zu[m]. Wiring LHd is coupled to the electrodes Zd[m]. The wiring LHd is a power supply line through which the offset electrical potential VBS is supplied.

The switching circuit 52 includes M switches SWa (SWa [1] to SWa[M]), M switches SWb (SWb[1] to SWb[M]), and a coupling state specifying circuit 52*a* that specifies coupling states of these switches.

The switch SWa[m] switches between conduction (ON) and non-conduction (OFF) between the wiring LHa for transmitting the first common drive signal ComA and the electrode Zu[m] of the drive element 51*f* [m]. The switch SWb[m] switches between conduction (ON) and non-conduction (OFF) between the wiring LHb for transmitting the second common drive signal ComB and the electrode Zu[m] of the drive element 51*f* [m]. Each of these switches is, for example, a transmission gate.

The coupling state specifying circuit 52*a* generates coupling state specifying signals SLa[1] to SLa[M] and coupling state specifying signals SLb[1] to SLb[M] based on the clock signal CLK, the print data signal SI, the latch signal LAT, and the change signal CNG supplied from the control circuit 21. The coupling state specifying signals SLa[1] to SLa[M] specify ON or OFF of the switches SWa[1] to SWa[M], respectively. The coupling state specifying signals SLb[1] to SLb[M] specify ON or OFF of the switches SWb[1] to SWb[M], respectively.

For example, although not illustrated, the coupling state specifying circuit 52*a* includes a plurality of transfer circuits, a plurality of latch circuits, and a plurality of decoders such that sets of the plurality of transfer circuits, the plurality of latch circuits, and the plurality of decoders correspond to the drive elements 51*f* [1] to 51*f* [M] in a one to-one manner. Among these, the print data signal SI is supplied to the transfer circuits. The print data signal SI includes individual specifying signals for the respective drive elements 51*f*. The individual specifying signals are serially supplied. For example, the individual specifying signals are sequentially transferred to the plurality of transfer circuits in synchronization with the clock signal CLK. The latch circuits latch, based on the latch signal LAT, the individual specifying signals supplied to the transfer circuits. The decoders generate coupling state specifying signals SLa[m] and SLb[m] based on the individual specifying signals, the latch signal LAT, and the change signal CNG.

The switch SWa[m] is switched on and off in accordance with the coupling state specifying signal SLa[m] generated as described above. For example, the switch SWa[m] is in an ON state when the coupling state specifying signal SLa[m] is at a high level, and is in an OFF state when the coupling state specifying signal SLa[m] is at a low level. As described above, the switching circuit 52 supplies a portion or all of a waveform included in the first common drive signal ComA as the supply signal Vin to one or more drive elements 51*f* selected from the plurality of drive elements 51*f*.

Similarly, the switch SWb[m] is switched on and off in accordance with the coupling state specifying signal SLb [m]. For example, the switch SWb[m] is in an ON state when the coupling state specifying signal SLb[m] is at a high level, and is in an OFF state when the coupling state specifying signal SLb[m] is at a low level. As described above, the switching circuit 52 supplies a portion or all of a waveform included in the second common drive signal ComB as the supply signal Vin to one or more drive elements 51*f* selected from the plurality of drive elements 51*f*.

A5. Drive Signal

Figure 5:
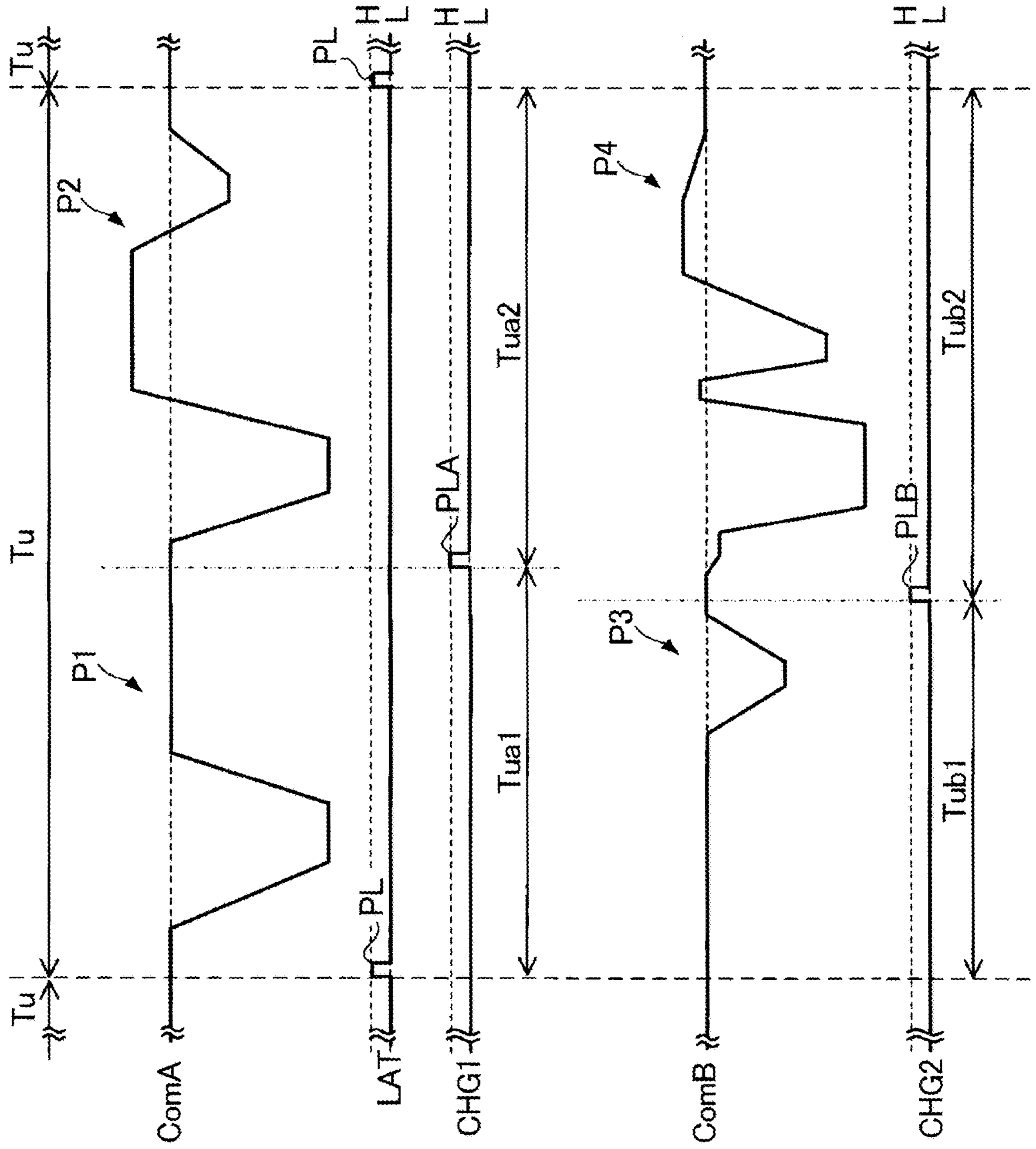
FIG. 5 is a diagram for explaining drive signals used in the first embodiment.

FIG. 5 is a diagram for explaining the common drive signal Com used in the first embodiment. As illustrated in FIG. 5, the latch signal LAT includes pulses PL for defining a driving cycle Tu. The driving cycle Tu corresponds to a printing cycle in which dots of the ink from the nozzles N are formed on the medium M. The driving cycle Tu is defined as, for example, a period of time from the rising edge of the pulse PL to the rising edge of the next pulse PL. A specific length of the driving cycle Tu is not particularly limited.

A change signal CNG1 includes a pulse PLA for dividing the driving cycle Tu into a preceding control period Tua1 and a succeeding control period Tua2. The control period Tua1 is, for example, a period of time from the rising edge of the pulse PL to the rising edge of the pulse PLA. The control period Tua2 is, for example, a period of time from the rising edge of the pulse PLA to the rising edge of the next pulse PL. A change signal CNG2 includes a pulse PLB for dividing the driving cycle Tu into a preceding control period Tub1 and a succeeding control period Tub2. The control period Tub1 is, for example, a period of time from the rising edge of the pulse PL to the rising edge of the pulse PLB. The control period Tub2 is, for example, a period of time from the rising edge of the pulse PLB to the rising edge of the next pulse PL.

The first common drive signal ComA includes a first ejection pulse P1 and a last ejection pulse P2 in this order in the driving cycle Tu. The first ejection pulse P1 is provided in the control period Tua1. The last ejection pulse P2 is provided in the control period Tua2.

The second common drive signal ComB includes a vibration imparting pulse P3 and an ejection pulse P4 in this order. The vibration imparting pulse P3 is provided in the control period Tub1. The ejection pulse P4 is provided in the control period Tub2.

Hereinafter, each of the first ejection pulse P1, the last ejection pulse P2, and the ejection pulse P4 may be referred to as an ejection pulse P. Each of the ejection pulses P is an electrical potential pulse for driving the drive elements 51*f* so as to cause the pressure applied to the ink in the pressure chambers C to fluctuate such that the ink is ejected from the nozzles N.

The first ejection pulse P1, the last ejection pulse P2, the vibration imparting pulse P3, and the ejection pulse P4 are appropriately selected and used for the supply signal Vin. By the selection of the pulses, it is possible to adjust the amounts of the ink to be ejected from the nozzles N, and minutely vibrate the ink in the nozzles N without ejecting the ink from the nozzles N.

For example, by appropriately combining the pulses in the driving cycle Tu, it is possible to eject, from each of the nozzles N, dots of mutually different sizes that are a first dot which is a large dot, a second dot which is a medium dot, and a third dot which is a small dot.

A plurality of types of dot drive signals are formed by appropriately selecting the pulses included in the common drive signal Com. Specifically, a first dot drive signal Vin1 for forming a first dot which is a large dot, a second dot drive signal Vin2 for forming a second dot which is a medium dot, and a third dot drive signal Vin3 for forming a third dot which is a small dot are formed.

A6. First Dot Drive Signal Vin1

Figure 6:
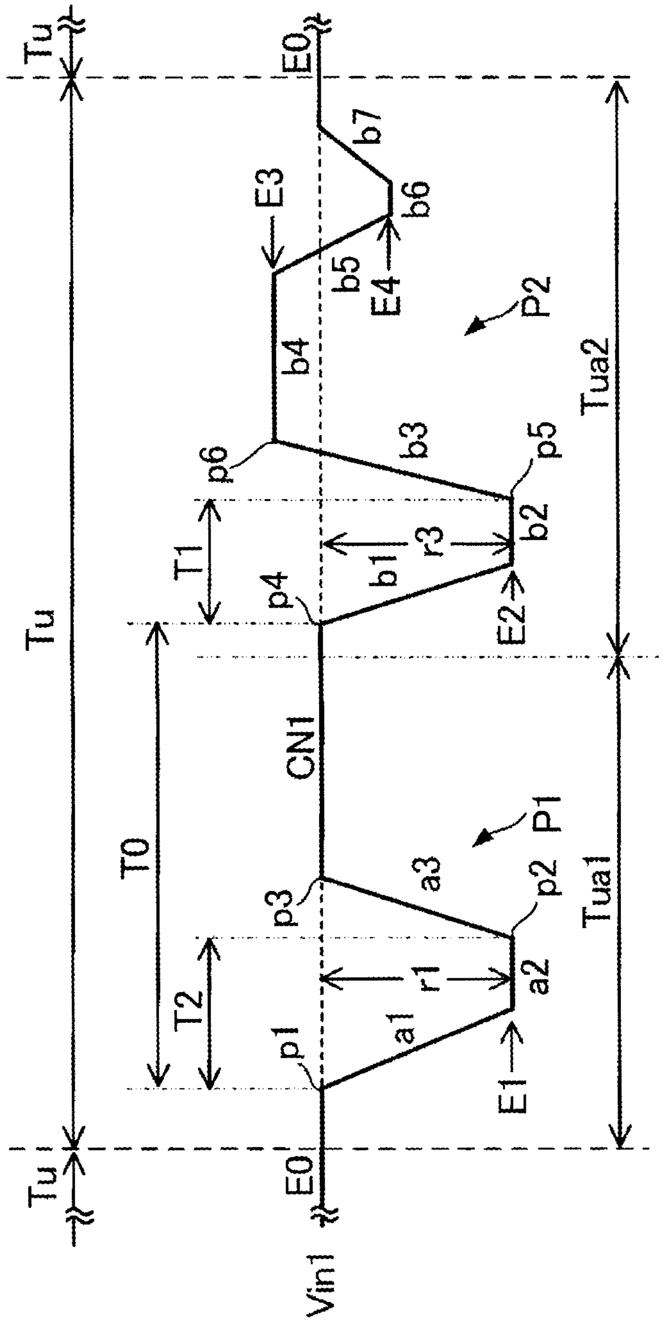
FIG. 6 is a diagram illustrating a first dot drive signal in the first embodiment.

FIG. 6 is a diagram illustrating the first dot drive signal Vin1 in the first embodiment. FIG. 6 illustrates a waveform of the first dot drive signal Vin1 when a large dot is to be formed on the medium M. The first dot drive signal Vin1 is supplied to each of the drive elements 51*f* as the supply signal Vin.

The first dot drive signal Vin1 is the same as the first common drive signal ComA, and includes a plurality of ejection pulses P including the first ejection pulse P1 and the last ejection pulse P2. The first dot drive signal Vin1 is generated by selecting the first ejection pulse P1 and the last ejection pulse P2 of the first common drive signal ComA. Each of the ejection pulses P causes one droplet DR to be ejected. Then, a plurality of droplets DR based on the plurality of ejection pulses P are combined before landing on the medium M, and a combined droplet DRA formed by combining the plurality of droplets DR lands on the medium M.

The first ejection pulse P in chronological order among the plurality of ejection pulses P is the first ejection pulse P1. The last ejection pulse P2 is also the next ejection pulse that follows the first ejection pulse P1 in chronological order among the plurality of ejection pulses P. A first coupling element CN1 is provided between the first ejection pulse P1 and the last ejection pulse P2. In the present embodiment, the first coupling element CN1 maintains a reference electrical potential E0. The reference electrical potential E0 is an electrical potential higher than the zero electrical potential and is, for example, an electrical potential higher than the offset electrical potential VBS. The first coupling element CN1 is a coupling element that couples the first ejection pulse P1 and the next second pulse.

The first ejection pulse P1 is a trapezoidal wave and has a filling element a1, a maintained element a2, and an ejection element a3 in this order. The first ejection pulse P1 has a so-called pull-push waveform. The filling element a1 is an element that changes an electrical potential to drive the drive element 51*f* so as to generate negative pressure in the pressure chamber C. The filling element a1 changes in electrical potential from the reference electrical potential E0 to a first electrical potential E1 lower than the reference electrical potential E0. The first electrical potential E1 is the lowest electrical potential of the voltage of the first ejection pulse P1. The maintained element a2 is an element that maintains the first electrical potential E1. The ejection element a3 is an element that changes the electrical potential to drive the drive element 51*f* so as to generate positive pressure in the pressure chamber C such that a droplet DR is ejected from the nozzle N. The ejection element a3 changes in electrical potential from the first electrical potential E1 to the reference electrical potential E0 and is coupled to the first coupling element CN1. The first coupling element CN1 maintains the reference electrical potential E0 until the start p4 of the last ejection pulse P2.

The last ejection pulse P2 includes a filling element b1, a maintained element b2, an ejection element b3, a maintained element b4, a damping element b5, a maintained element b6, and a return element b7 in this order. The last ejection pulse P2 includes a so-called pull-push-pull waveform including the filling element b1, the maintained element b2, the ejection element b3, the maintained element b4, and the damping element b5. The filling element b1 is an element that changes the electrical potential to drive the drive element 51*f* so as to generate negative pressure in the pressure chamber C. The filling element b1 is coupled to the first coupling element CN1 and changes in electrical potential from the reference electrical potential E0 to a second electrical potential E2 lower than the reference electrical potential E0. The second electrical potential E2 is the lowest electrical potential of the voltage of the last ejection pulse P2. The maintained element b2 is an element that maintains the second electrical potential E2. The ejection element b3 is an element that changes the electrical potential to drive the drive element 51*f* so as to generate positive pressure in the pressure chamber C such that a droplet DR is ejected from the nozzle N. The ejection element b3 changes in electrical potential from the second electrical potential E2 to a third electrical potential E3 higher than the reference electrical potential E0. The third electrical potential E3 is the highest electrical potential of the voltage of the last ejection pulse P2. The reference electrical potential E0 is between the third electrical potential E3 and the first electrical potential E1. The reference electrical potential E0 is between the third electrical potential E3 and the second electrical potential E2.

The maintained element b4, the damping element b5, the maintained element b6, and the return element b7 form a damping pulse. The maintained element b4 maintains the third electrical potential E3 after the ejection element b3.

The damping element b5 is an element that changes in electrical potential after the ejection element b3 to reduce a fluctuation in the pressure in the pressure chamber C. The damping element b5 is an element that drives the drive element 51*f* so as to generate negative pressure in the pressure chamber C. The time period of the maintained element b4 is set such that residual vibration is reduced by generating negative pressure by the damping element b5 at a timing at which the pressure remaining in the ink in the ejection section 510 after the ejection element b3 is positive pressure. The damping element b5 changes in electrical potential from the third electrical potential E3 to an electrical potential E4 that is lower than or equal to the reference electrical potential E0. The electrical potential E4 is higher than the second electrical potential E2 and lower than the reference electrical potential E0. The maintained element b6 maintains the electrical potential E4. The return element b7 is an element that drives the drive element 51*f* so as to generate positive pressure in the pressure chamber C. The return element b7 changes in electrical potential from the electrical potential E4 to the reference electrical potential E0. That is, the return element b7 is an element that returns from the electrical potential E4 other than the reference electrical potential E0 to the reference electrical potential E0.

The first dot which is a large dot can be printed on the medium M by supplying the first dot drive signal Vin1 to the drive element 51*f* during a single driving cycle Tu.

Figure 7:
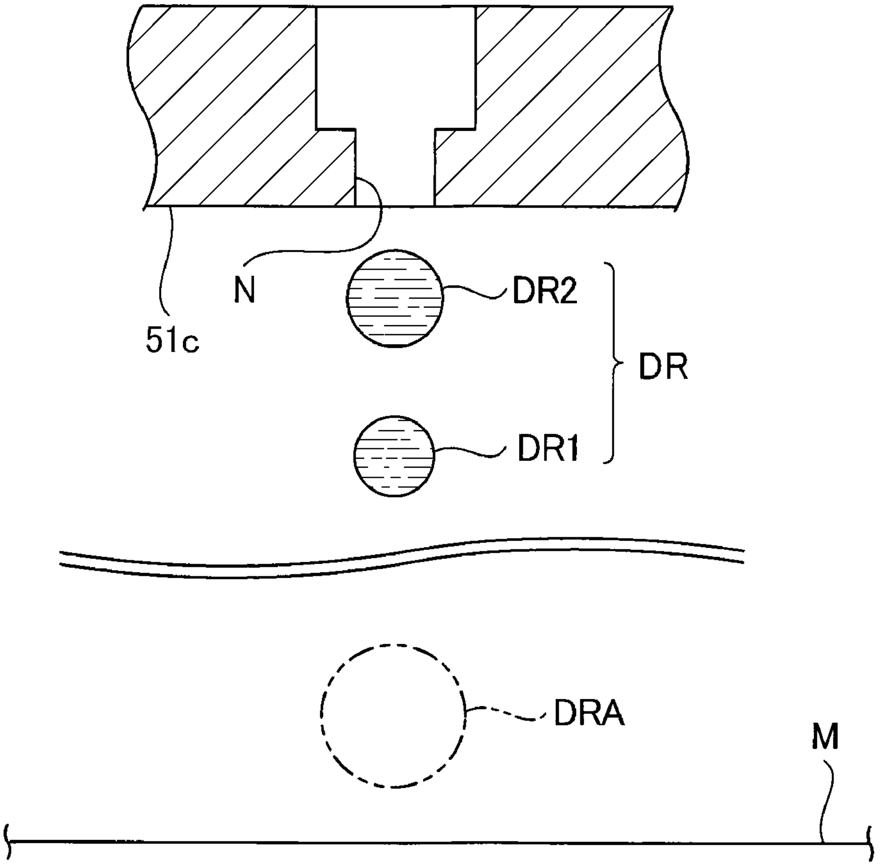
FIG. 7 is a diagram for explaining a combined droplet obtained by combining a plurality of droplets sequentially ejected from a nozzle.

FIG. 7 is a diagram for explaining a combined droplet DRA obtained by combining a plurality of droplets DR sequentially ejected from the nozzle N. FIG. 7 illustrates, as the plurality of droplets DR, a droplet DR1 based on the first ejection pulse P1 and a droplet DR2 based on the last ejection pulse P2.

After the first dot drive signal Vin1 illustrated in FIG. 6 is supplied to the drive element 51*f*, the droplet DR1 and the droplet DR2 are ejected from the nozzle N in this order, as illustrated in FIG. 7. Ejection conditions such as flying speeds and ejection timings of the droplets DR1 and DR2 are set such that the subsequent droplet DR2 catches up with the droplet DR1 before the droplet DR2 lands on the medium M. The combined droplet DRA obtained by combining the droplet DR1 and the droplet DR2 is formed before landing on the medium M. Then, the combined droplet DRA lands on the medium M.

As described above, the ejection element a3 of the first ejection pulse P1 changes in electrical potential from the first electrical potential E1 to the reference electrical potential E0 and is coupled to the first coupling element CN1. Therefore, the first ejection pulse P1 includes a trapezoidal pulse, and includes a so-called pull-push waveform without including a so-called pull-push-pull waveform. On the other hand, the filling element b1 of the last ejection pulse P2 changes in electrical potential from an electrical potential equal to or higher than the reference electrical potential E0 to the second electrical potential E2, the ejection element b3 of the last ejection pulse P2 changes in electrical potential from the second electrical potential E2 to a third electrical potential E3 higher than the reference electrical potential E0, and the damping element b5 of the last ejection pulse P2 changes in electrical potential from the third electrical potential E3 to an electrical potential equal to or lower than the reference electrical potential E0. Therefore, the last ejection pulse P2 includes a so-called pull-push-pull waveform, and the electrical potential change range of the last ejection pulse P2 is wider than that of the first ejection pulse P1.

Figure 28:
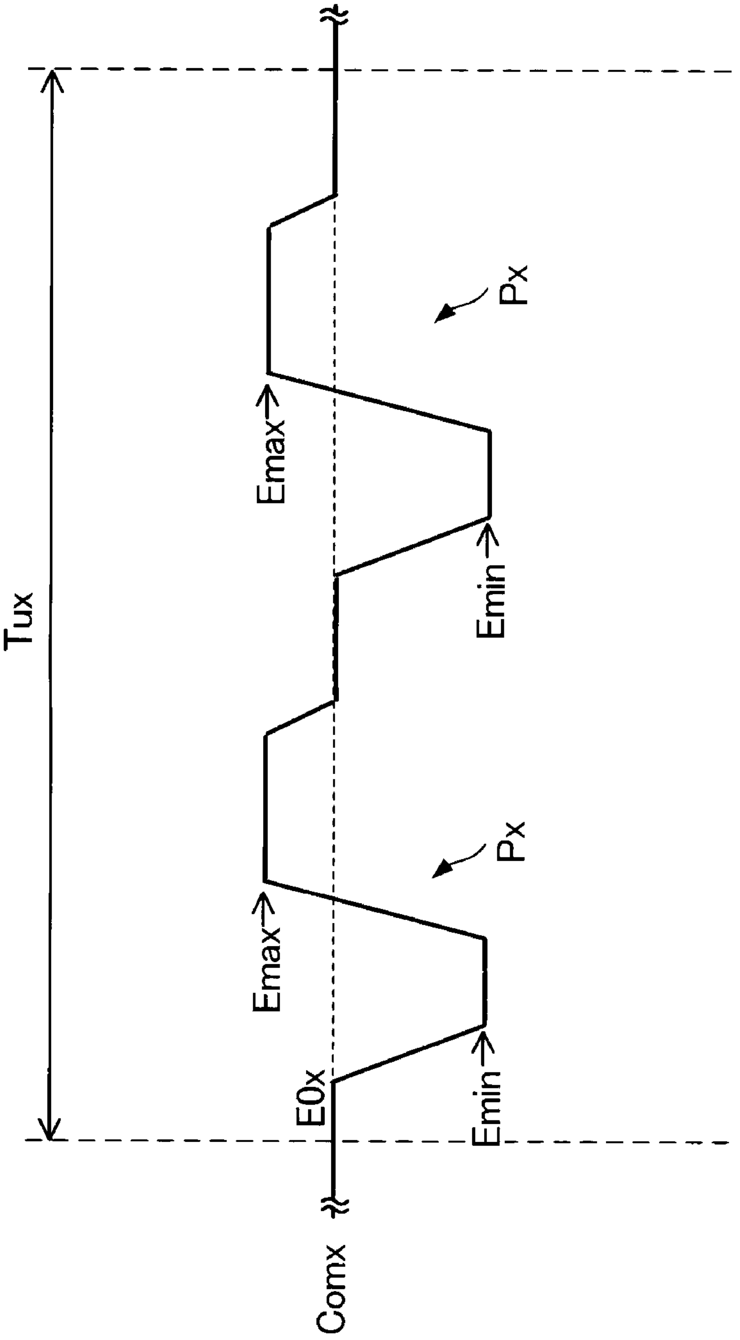
FIG. 28 is a diagram illustrating a drive signal according to an existing technique.

Since the first ejection pulse P1 which is a trapezoidal pulse is provided, it is possible to shorten the driving cycle Tu without excessively increasing the flying speed of the ink, compared to each ejection pulse Px of a so-called pull-push-pull waveform illustrated in FIG. 28 according to the existing technique. Therefore, even when a time interval between the first ejection pulse P1 and the last ejection pulse P2 is narrowed by high-speed driving, the droplets DR1 and DR2 are easily combined, and the instability of the ejection of ink can be reduced as compared to the existing technique. In addition, since the first ejection pulse P1 which is a trapezoidal pulse causes a small amount of ink to be ejected and ink refilling is fast, compared to each ejection pulse Px of the so-called pull-push-pull waveform, it is advantageous from the viewpoint of securing the amount of ink to be ejected by the last ejection pulse P2.

Further, since the last ejection pulse P2 is provided, the electrical potential change range can be increased as compared with the first ejection pulse P1, and thus the amount of a droplet can be increased. Therefore, since the first dot drive signal Vin1 including the first ejection pulse P1 and the last ejection pulse P2 is used, it is possible to reduce the instability of the ejection of ink in the high-speed driving while securing the amount of ink droplets.

As described above, the first dot drive signal Vin1 is a combination of the first ejection pulse P1 that is a trapezoidal wave and the last ejection pulse P2 that is a so-called pull-push-pull waveform which is not a trapezoidal waveform. Therefore, it is possible to adjust the flying speeds of the droplets while generating the droplets having different sizes without increasing the waveform length, and it is possible to cause the combined droplet DRA to land at a desired position.

In the present embodiment, a time period T1 from the start p4 of the filling element b1 of the last ejection pulse P2 to the start p5 of the ejection element b3 of the last ejection pulse P2 illustrated in FIG. 6 is greater than or equal to 0.3 TC and less than 0.5 TC. TC indicates the natural vibration period of the ejection section 510. By setting the time period T1 within the above-described range, it is possible to reduce a variation in the landing positions of the ink ejected from the plurality of ejection sections 510, compared to a case where the time period T1 is out of the range. In addition, the amount of ink to be ejected can be increased by the residual vibration.

The last ejection pulse P2 of the first dot drive signal Vin1 includes the damping element b5. Therefore, compared to a case where the damping element b5 is not included, it is possible to maintain the stability of a meniscus in the nozzle N after the application of the last ejection pulse P2.

Figure 8:
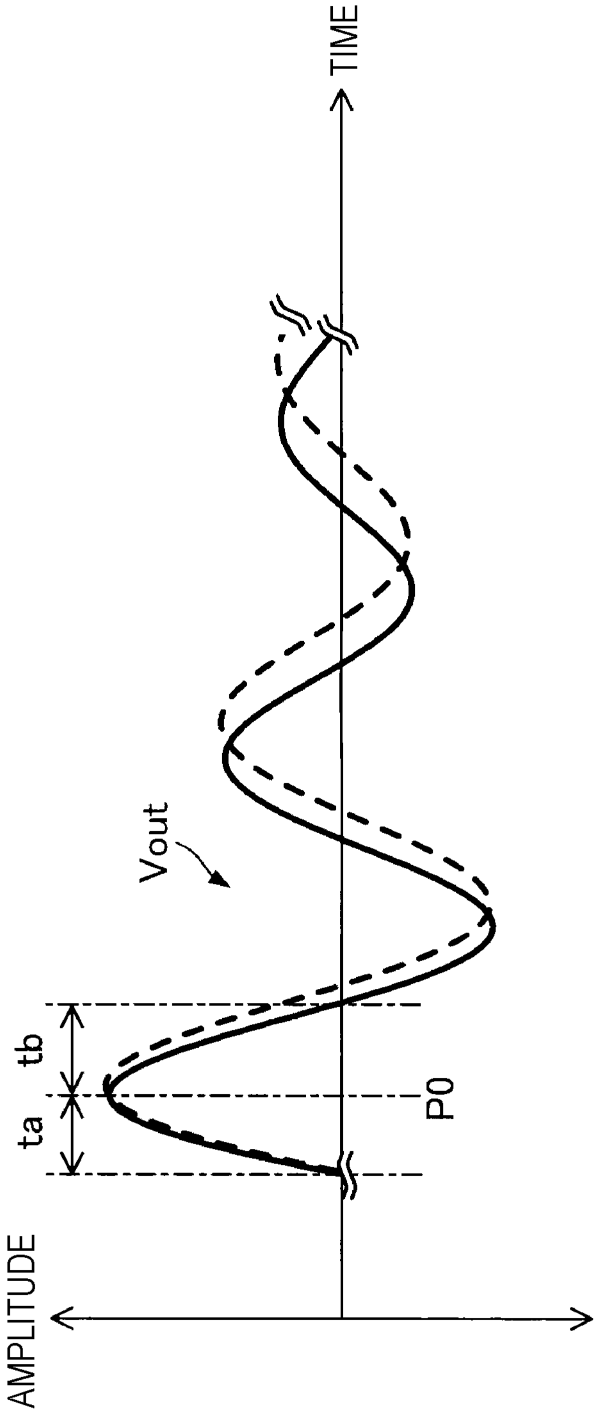
FIG. 8 is a diagram illustrating a residual vibration signal.

FIG. 8 is a diagram illustrating residual vibration signals Vout that correspond to fluctuations in the pressure applied to the ink that remain after the pressure applied to the ink in the pressure chambers C is caused to fluctuate. For example, when electromotive force generated in the drive element 51*f* is measured after the drive element 51*f* is driven to cause a fluctuation in the pressure applied to the ink in the pressure chamber C, a residual vibration signal Vout as illustrated in FIG. 8 is detected. The residual vibration has the natural vibration period TC determined by the shape of the nozzle N, the shape of the individual flow path, the weight of the ink in the flow path of the head chip 3, the viscosity of the ink, and the like.

The residual vibration signals Vout illustrated in FIG. 8 may differ for each of the plurality of ejection sections 510 due to a manufacturing error or the like. For example, the residual vibration signal Vout of a certain ejection section 510 is indicated by a solid line, and the residual vibration signal Vout of another ejection section 510 is indicated by a broken line. Such a difference in signal between the ejection sections 510 increases as time elapses. In a time period Ta before the first peak P0 of the residual vibration signal Vout, the difference is the smallest. The time period Ta includes a time period greater than or equal to 0.3 TC and less than 0.5 TC. A time period Tb immediately after the first peak P0 is less likely to be affected by the residual vibration than the time period Ta, and a satellite is less likely to occur. The time period Tb includes a time period greater than or equal to 0.5 TC and less than 0.7 TC.

As described above, the amount of the ink ejected by the last ejection pulse P2 is greater than the amount of the ink ejected by the first ejection pulse P1. Therefore, the last ejection pulse P2 has a larger effect on the landing speed and the landing position of the combined droplet DRA than the first ejection pulse P1. Therefore, the effect of the droplet DR2 on the combined droplet DRA is large. Therefore, by setting the time period T1 of the last ejection pulse P2, which is related to the droplet DR2 which has a great effect on the landing speed and the landing position of the combined droplet DRA, to be greater than or equal to 0.3 TC and less than 0.5 TC, it is possible to reduce a variation in the landing positions of the ink ejected from the plurality of ejection sections 510.

A first pulse interval T0 is not particularly limited, but is preferably greater than or equal to 1.7 TC and less than 2.7 TC. The first pulse interval T0 is a time period from the start p1 of the filling element a1 of the first ejection pulse P1 to the start p4 of the filling element b1 of the last ejection pulse P2 which is the next ejection pulse that follows the first ejection pulse P1. Since the first pulse interval T0 is within the above-described range, it is possible to increase the amount of the droplet DR2 to be ejected, due to the synergy between the residual vibration generated in the ink in the ejection section 510 by the first ejection pulse P1 and the fluctuation in the pressure applied to the ink in the ejection section 510 by the last ejection pulse P2, compared to a case where the first pulse interval T0 is out of the range. In addition, it is easy to combine the droplets DR1 and DR2 before the droplet DR2 lands on the medium M.

When the first pulse interval T0 is less than 1.7 TC, a satellite is likely to occur at the time of ejection by the last ejection pulse P2. This is due to the fact that the amplitude of the residual vibration caused by the first ejection pulse P1 is still too large, and therefore, the fluctuation in the pressure of the ink by the last ejection pulse P2 following the first ejection pulse P1 tends to be unstable. On the other hand, when the first pulse interval T0 is greater than or equal to 2.7 TC, the time interval between the first ejection pulse P1 and the last ejection pulse P2 is too long, the droplet DR2 may not catch up with the droplet DR1, and the combined droplet DRA may not be formed. In addition, the residual vibration caused by the first ejection pulse P1 may be damped, the synergistic effect with the fluctuation in the pressure of the ink in the ejection section 510 by the last ejection pulse P2 may not be obtained, and a desired amount of ink may not be ejected.

The pulse width T2 of the first ejection pulse P1 is not particularly limited, but is preferably greater than or equal to 0.3 TC and less than 0.5 TC. The pulse width T2 is a time period from the start p1 of the filling element a1 of the first ejection pulse P1 to the start p2 of the ejection element a3. Since the pulse width T2 is within the above-described range, it is possible to shorten the entire waveform length while reducing variations in the flying speeds and weights of ink droplets to be ejected from the plurality of ejection sections 510, compared to a case where the pulse width T2 is out of the range. Therefore, it is particularly suitable for high-speed driving.

In addition, the rate r1 of change in the electrical potential of the filling element a1 of the first ejection pulse P1 is equal to or lower than the rate r3 of change in the electrical potential of the filling element b1 of the last ejection pulse P2. In the present embodiment, the rate r1 of change in the electrical potential is equal to the rate r3 of change in the electrical potential. Therefore, for example, even when the effect of the residual vibration caused by the last ejection pulse P2 remains at the start p1 of the first ejection pulse P1 in the next second cycle after the last ejection pulse P2 in the first cycle, it is possible to reduce the instability of the ejection by the first ejection pulse P1.

A7. Second Dot Drive Signal Vin2

Figure 9:
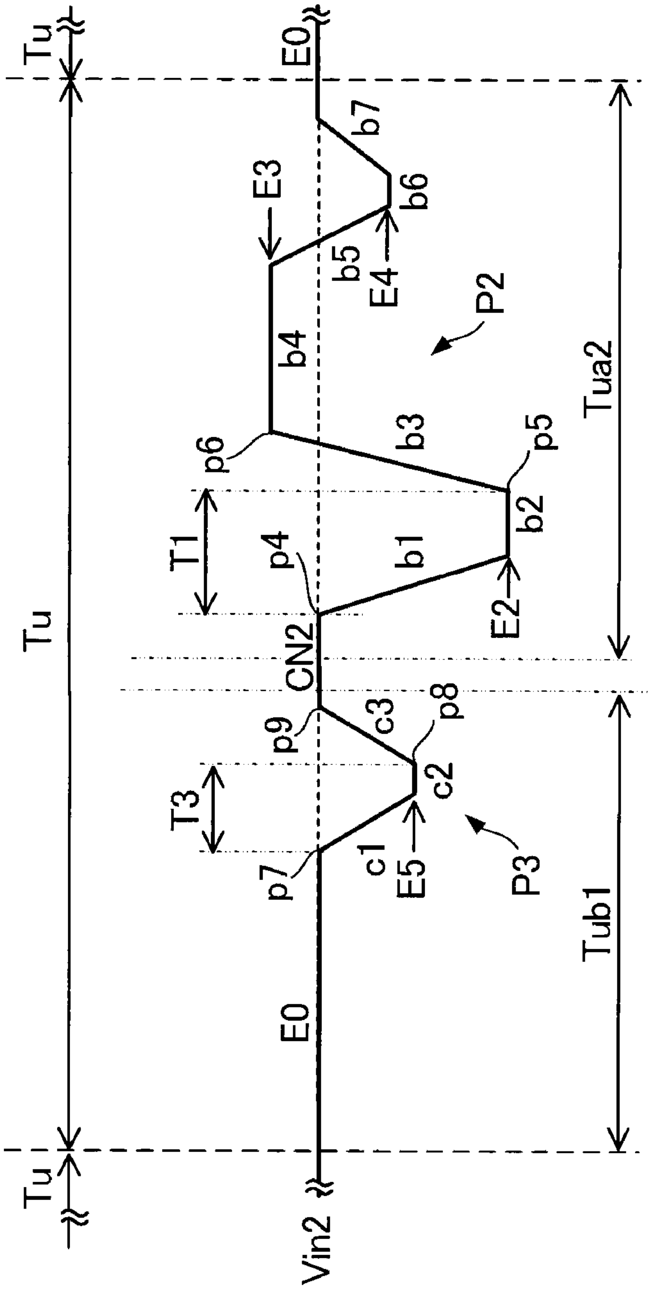
FIG. 9 is a diagram illustrating a second dot drive signal in the first embodiment.

FIG. 9 is a diagram illustrating the second dot drive signal Vin2 in the first embodiment. FIG. 9 illustrates a waveform of the second dot drive signal Vin2 when the second dot which is a medium dot is to be formed on the medium M.

The second dot drive signal Vin2 includes a vibration imparting pulse P3 and a last ejection pulse P2. Specifically, the second dot drive signal Vin2 is generated by selecting the vibration imparting pulse P3 of the second common drive signal ComB and the last ejection pulse P2 of the first common drive signal ComA during the single driving cycle Tu. A second coupling element CN2 is provided between the vibration imparting pulse P3 and the last ejection pulse P2. The second coupling element CN2 maintains the reference electrical potential E0.

The vibration imparting pulse P3 pressurizes and depressurizes the ink in the pressure chamber C to cause a fluctuation in the pressure applied to the liquid in the pressure chamber C without ejecting the ink from the nozzle N. As described above, the last ejection pulse P2 causes the pressure applied to the liquid in the pressure chamber C to fluctuate such that the ink is ejected from the nozzle N. Therefore, one droplet DR is ejected from the nozzle N by the application of the second common drive signal ComB and lands on the medium M. That is, a combined droplet DRA is not formed by the second dot drive signal Vin2.

The vibration imparting pulse P3 has an expansion element c1, a maintained element c2, and a contraction element c3 in this order. The expansion element c1 is an element that changes the electrical potential to drive the drive element 51*f* so as to cause negative pressure in the pressure chamber C. The expansion element c1 changes in electrical potential from the reference electrical potential E0 to an electrical potential E5 lower than the reference electrical potential E0. The electrical potential E5 is the lowest electrical potential of the voltage of the vibration imparting pulse P3. The maintained element c2 maintains the electrical potential E5. The contraction element c3 is an element that changes the electrical potential to drive the drive element 51*f* so as to generate positive pressure in the pressure chamber C to the extent that a droplet DR is not ejected from the nozzle N. The contraction element c3 changes in electrical potential from the electrical potential E5 to the reference electrical potential E0 and is coupled to the second coupling element CN2. The second coupling element CN2 couples the ending edge p9 of the vibration imparting pulse P3 and the start p4 which is the starting edge of the last ejection pulse P2. The second coupling element CN2 maintains the reference electrical potential E0. The start p4 of the last ejection pulse P2 is also the starting edge of the last ejection pulse P2.

By supplying the second dot drive signal Vin2 to the drive element 51*f* during the single driving cycle Tu, the second dot, which is a medium dot smaller than the first dot which is a large dot, can be printed on the medium M. The amount of the ink to be ejected by the last ejection pulse P2 can be increased using the residual vibration caused by the vibration imparting pulse P3.

As described above, by supplying, to the drive element 51*f*, the first dot drive signal Vin1 generated by selecting the first ejection pulse P1 and the last ejection pulse P2 of the first common drive signal ComA during the single driving cycle Tu, it is possible to print the first dot, which is a large dot, on the medium M. It is possible to print the second dot, which is a medium dot, on the medium M by supplying, to the drive element 51*f*, the second dot drive signal Vin2 generated by selecting the vibration imparting pulse P3 of the second common drive signal ComB, which is different from the first common drive signal ComA, and the last ejection pulse P2 of the first common drive signal ComA. Therefore, rather than arranging all pulses necessary for forming different dots in one common drive signal Com in chronological order, pulses necessary for forming different dots are dispersed to a plurality of common drive signals Com, and some pulses are used in common for forming different dots, whereby the length of a single driving cycle can be shortened and gradation expression can be performed by high-frequency driving. In addition, each of the second dot drive signal Vin2 and the first dot drive signal Vin includes the last ejection pulse P2 of the first common drive signal ComA. Therefore, by using the last ejection pulse P2 in order to form dots of different sizes, it is possible to easily align the landing positions of dots of different sizes.

For example, regarding two adjacent nozzles N, the first dot drive signal Vin1 is applied as a supply signal Vin[m] to the drive element 51[m] corresponding to one nozzle N[m], and the second dot drive signal Vin2 is applied as a supply signal Vin[m+1] to the drive element 51*f*[m+1] corresponding to the other nozzle N[m+1]. In this case, it is possible to reduce deviations from landing positions in a dot arrangement direction in which a first dot ejected from the one nozzle N[m] and a second dot ejected from the other nozzle N[m+1] are to be arranged.

The ratio of the size of the second dot relative to the size of the first dot can be easily adjusted by adjusting the length of the second coupling element CN2. The time period of the second coupling element CN2 is not particularly limited, but is preferably greater than or equal to 0.3 TC and less than 0.5 TC. In the example illustrated in FIG. 9, a time period from the ending edge p9 of the vibration imparting pulse P3 to the start p4 of the filling element b1 of the last ejection pulse P2 can be set to be greater than or equal to 0.3 TC and less than 0.5 TC. When the time period of the second coupling element CN2 is within the above-described range, it is easy to increase the size of the second dot and it is possible to reduce deviations from the landing positions, compared to a case where the time period of the second coupling element CN2 is out of the range.

In the formation of the second dot, when the flying speed of the last ejection pulse P2 is to be decreased to align the landing position of the first dot and the size of the first dot is to be adjusted to be small, the time period of the second coupling element CN2 can be set to be equal to or greater 0.5 TC and less than 0.7 TC.

The application of the vibration imparting pulse P3 is not limited to the formation of the second dot. For example, the vibration imparting pulse P3 can also be used for driving to finely vibrate a meniscus of the ink in the nozzle N in order to suppress the thickening of the ink in the nozzle N in a driving cycle Tu in which the ink is not ejected. Therefore, the vibration imparting pulse P3 is used for both the formation of the second dot and the micro-vibration driving for suppressing the thickening.

The pulse width T3 of the vibration imparting pulse P3 is not particularly limited, but is preferably greater than or equal to 0.3 TC and less than 0.5 TC. The pulse width T3 is a time period from the start p7 of the expansion element c1 of the vibration imparting pulse P3 to the start p8 of the contraction element c3. Since the pulse width T3 is within the above-described range, it is possible to efficiently cause the pressure applied to the ink in the pressure chamber C to fluctuate with a relatively small electrical potential change range, compared to a case where the pulse width T3 is out of the range.

A8. Third Dot Drive Signal Vin3

Figure 10:
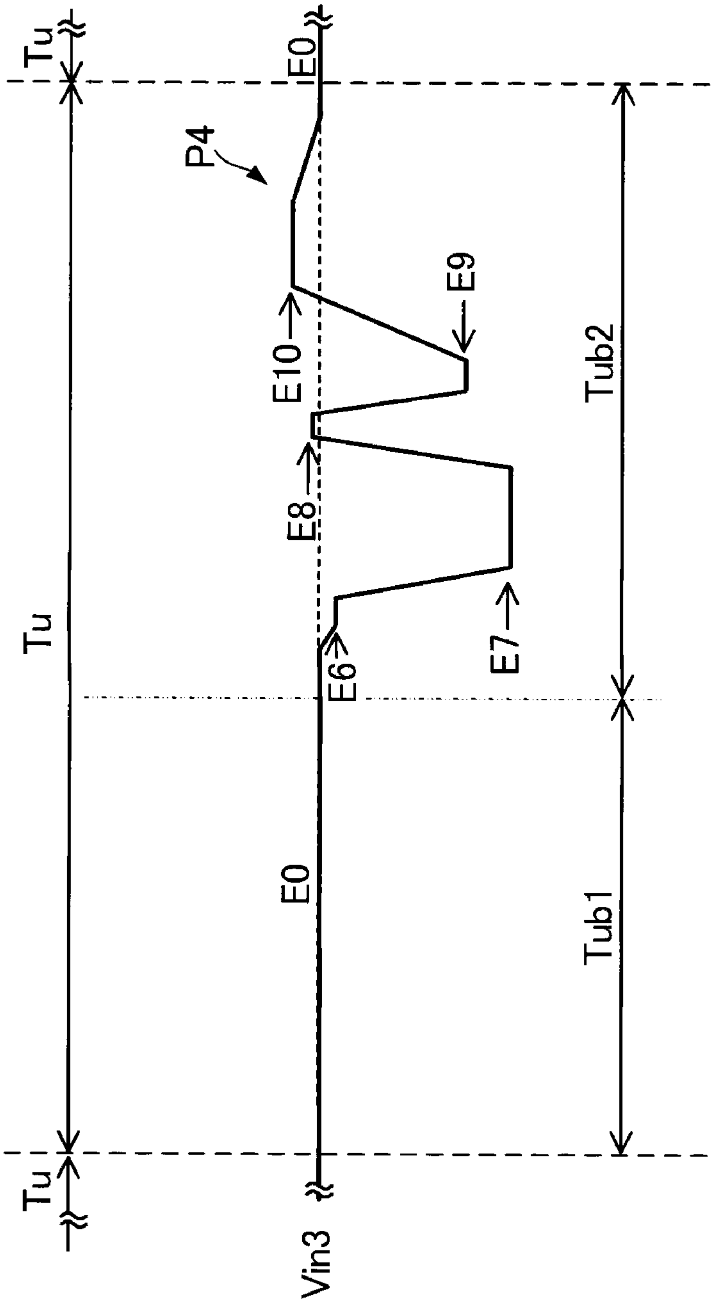
FIG. 10 is a diagram illustrating a third dot drive signal in the first embodiment.

FIG. 10 is a diagram illustrating the third dot drive signal Vin3 in the first embodiment. FIG. 10 illustrates a waveform of the third dot drive signal Vin3 when the third dot which is a small dot is to be formed on the medium M.

The third dot drive signal Vin3 includes an ejection pulse P4. The third dot drive signal Vin3 is generated by selecting the ejection pulse P4 of the second common drive signal ComB during the single driving cycle Tu. The ejection pulse P4 pressurizes and depressurizes the ink in the pressurize chamber C to cause the pressure applied to the liquid in the pressure chamber C to fluctuate such that the ink is ejected from the nozzle N.

The ejection pulse P4 changes in electrical potential from the reference electrical potential E0 to an electrical potential E6 lower than the reference electrical potential E0, maintains the electrical potential E6, then changes to a further lower electrical potential E7, and maintains the electrical potential E7. Thereafter, the ejection pulse P4 changes in electrical potential from the electrical potential E7 to an electrical potential E8 higher than the reference electrical potential E0, maintains the electrical potential E8, then changes in electrical potential to an electrical potential E9 lower than the reference electrical potential E0, and maintains the electrical potential E9. Thereafter, the ejection pulse P4 changes in electrical potential from the electrical potential E9 to an electrical potential E10 higher than the electrical potential E8, maintains the electrical potential E10, and then changes in electrical potential so as to return to the reference electrical potential E0. The third dot is ejected while the ejection pulse P4 changes in electrical potential from the electrical potential E7 to the electrical potential E8 and then changes in electrical potential from the electrical potential E8 to the electrical potential E9.

The third dot which is a small dot can be printed on the medium M by supplying the third dot drive signal Vin3 to the drive element 51*f* during the single driving cycle Tu.

A9. First Modification

Figure 11:
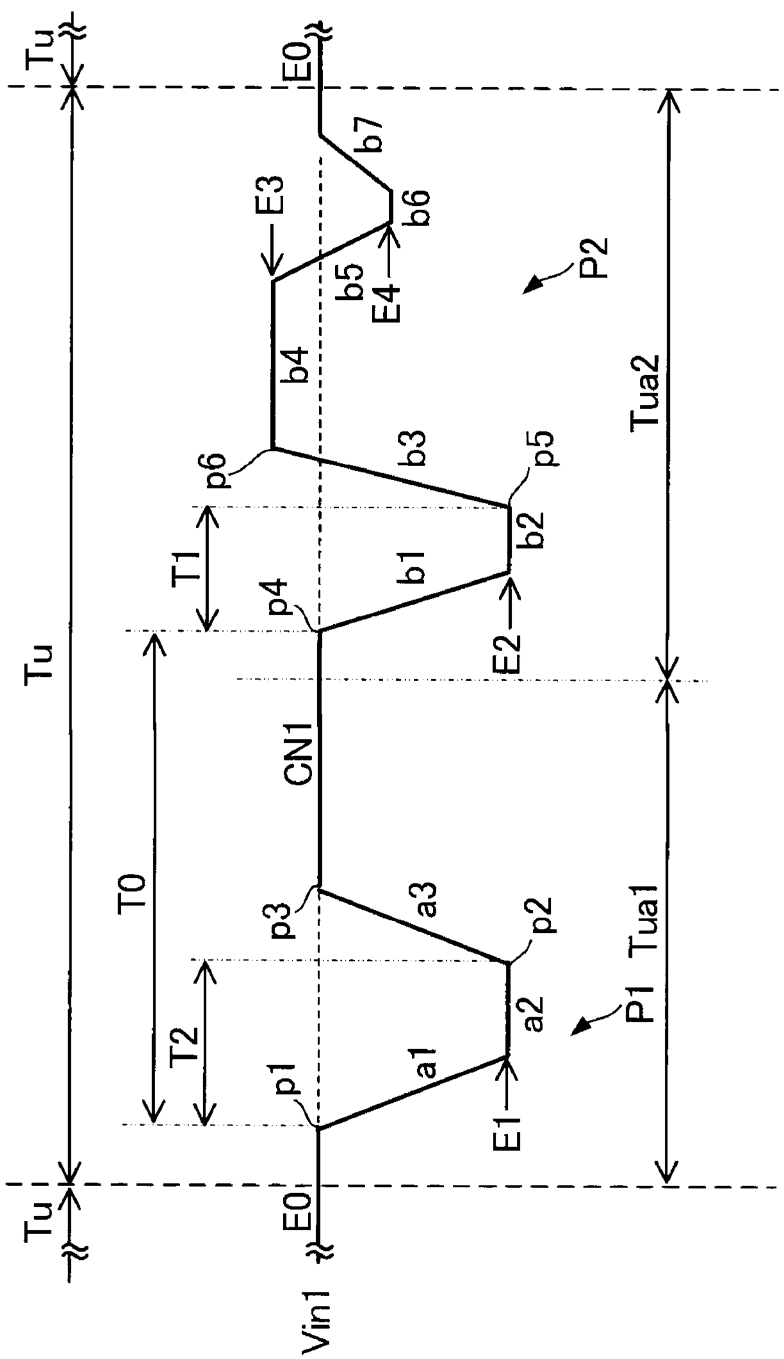
FIG. 11 is a diagram illustrating a first dot drive signal in a first modification.

FIG. 11 is a diagram illustrating a first dot drive signal Vin1 in a first modification. In the first dot drive signal Vin1 in the first modification, a preferable range of the pulse width T2 of the first ejection pulse P1 is different from the range described in the first embodiment.

Specifically, the pulse width T2 of the first ejection pulse P1 is greater than or equal to 0.5 TC and less than 0.7 TC. The pulse width T2 is a time period from the start p1 of the filling element a1 of the first ejection pulse P1 to the start p2 of the ejection element a3. With the start of the filling element a1, the pressure applied to the ink in the ejection section 510 starts to change to negative pressure, and changes to positive pressure after 0.5 TC. By setting the pulse width T2 of the first ejection pulse P1 to be greater than or equal to 0.5 TC and less than 0.7 TC, it is possible to apply positive pressure by the ejection element a3 in synergy with the natural vibration occurring in the ink in the ejection section 510. Therefore, when the pulse width T2 of the first ejection pulse P1 is within the above-described range, it is possible to suppress pressurization by the ejection element a3, and it is easy to secure the weight of the droplet DR1 by the first ejection pulse P1 while suppressing the speed of the first ejection pulse P1. The time period Tb of the residual vibration signal Vout illustrated in FIG. 8 described above includes a time period greater than or equal to 0.5 TC and less than 0.7 TC.

By setting the pulse width T2 of the first ejection pulse P1 to be greater than or equal to 0.5 TC, the droplet DR1 by the first ejection pulse P1 is absorbed by the droplet DR2 by the subsequent last ejection pulse P2 even when a variation in the speed of the droplet DR1 by the first ejection pulse P1 is caused by a variation in the natural vibration periods TC of the respective ejection sections 510. Therefore, the first ejection pulse P1 has a low contribution rate to a deviation from the landing position.

A10. Second Modification

Figure 12:
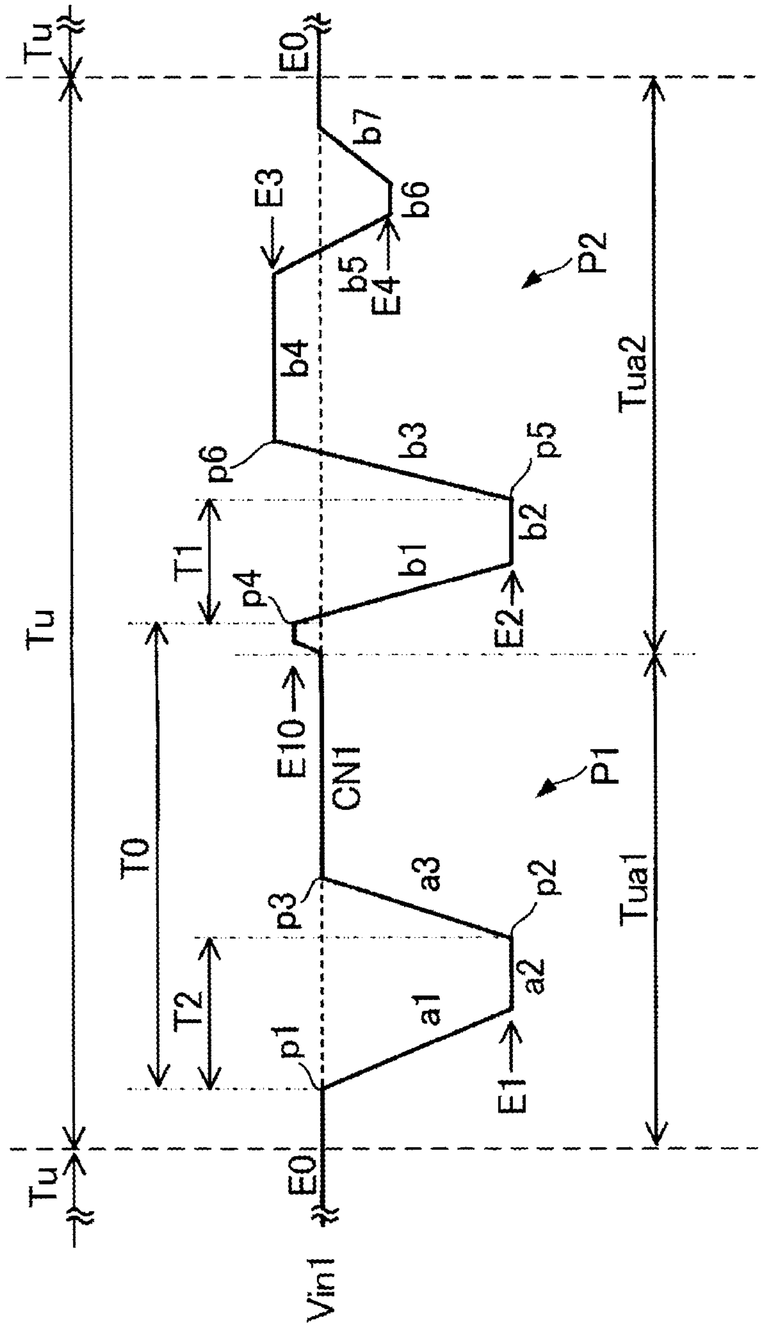
FIG. 12 is a diagram illustrating a first dot drive signal in a second modification.

FIG. 12 is a diagram illustrating a first dot drive signal Vin1 in a second modification. In the first dot drive signal Vin1 in the second modification, the first coupling element CN1 does not maintain the reference electrical potential E0 from the ending edge p3 of the first ejection pulse P1 to the start p4 of the last ejection pulse P2. In the second modification, the first coupling element CN1 maintains the reference electrical potential E0 for a certain period from the ending edge p3 of the first ejection pulse P1, and then changes in electrical potential to an electrical potential E10 higher than the reference electrical potential E0.

In the second modification, the filling element b1 of the last ejection pulse P2 changes in electrical potential from the electrical potential E10 higher than the reference electrical potential E0 to the second electrical potential E2. According to the second modification, the same effects as those obtained in the first embodiment can be obtained. In addition, according to the first coupling element CN1 in the second modification, it is possible to generate large negative pressure in the pressure chamber C by the filling element b1 of the last ejection pulse P2, compared with the first embodiment. Therefore, the weight of the droplet DR2 can be increased.

B. Second Embodiment

A second embodiment of the present disclosure will be described below. In the embodiment described below, elements having the same operational effects and functions as those described in the first embodiment are denoted by the same reference signs as those used in the description of the first embodiment, and detailed description thereof is omitted as appropriate.

Figure 13:
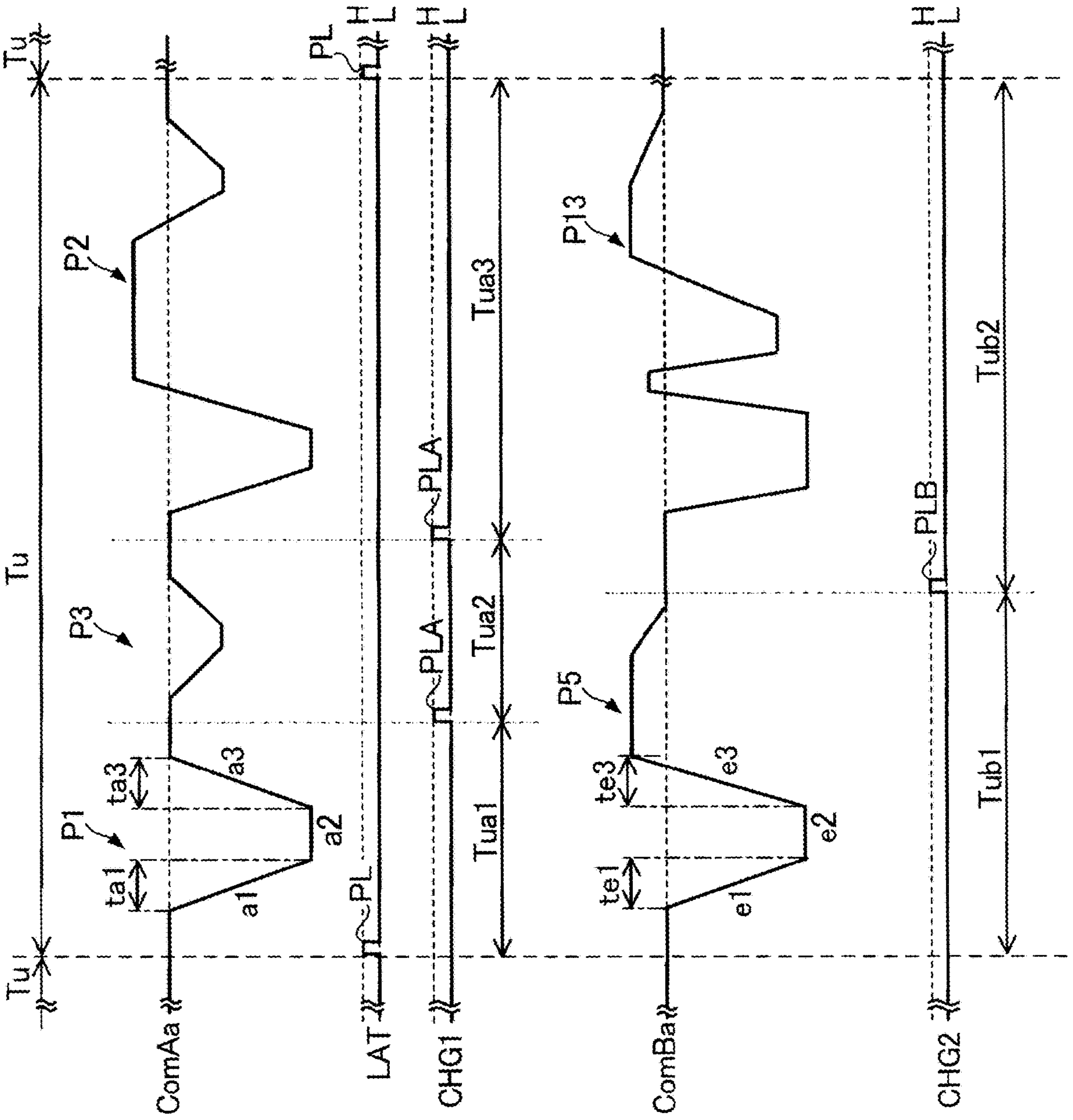
FIG. 13 is a diagram for explaining drive signals used in a second embodiment.

FIG. 13 is a diagram for explaining a common drive signal Com used in the second embodiment. As illustrated in FIG. 13, the common drive signal Com according to the present embodiment includes a first common drive signal ComAa and a second common drive signal ComBa.

The first common drive signal ComAa includes a first ejection pulse P1, a vibration imparting pulse P3, and a last ejection pulse P2 in this order. The first ejection pulse P1 is provided in a control period Tua1. The vibration imparting pulse P3 is provided in a control period Tua2. The last ejection pulse P2 is provided in a control period Tua3. The second common drive signal ComBa includes a second ejection pulse P5 and an ejection pulse P13. The second ejection pulse P5 is provided in a control period Tub1. The ejection pulse P13 is provided in a control period Tub2.

A first dot drive signal Vin1, a second dot drive signal Vin2*a*, and a third dot drive signal Vin3*a* are formed by appropriately selecting the pulses included in the first common drive signal ComAa and the second common drive signal ComBa. The first dot drive signal Vin1 is the same as the first dot drive signal Vin1 in the first embodiment and is generated by selecting the first ejection pulse P1 and the last ejection pulse P2 of the first common drive signal ComAa. The third dot drive signal Vin3*a* is generated by selecting the ejection pulse P13 of the second common drive signal ComBa.

Figure 14:
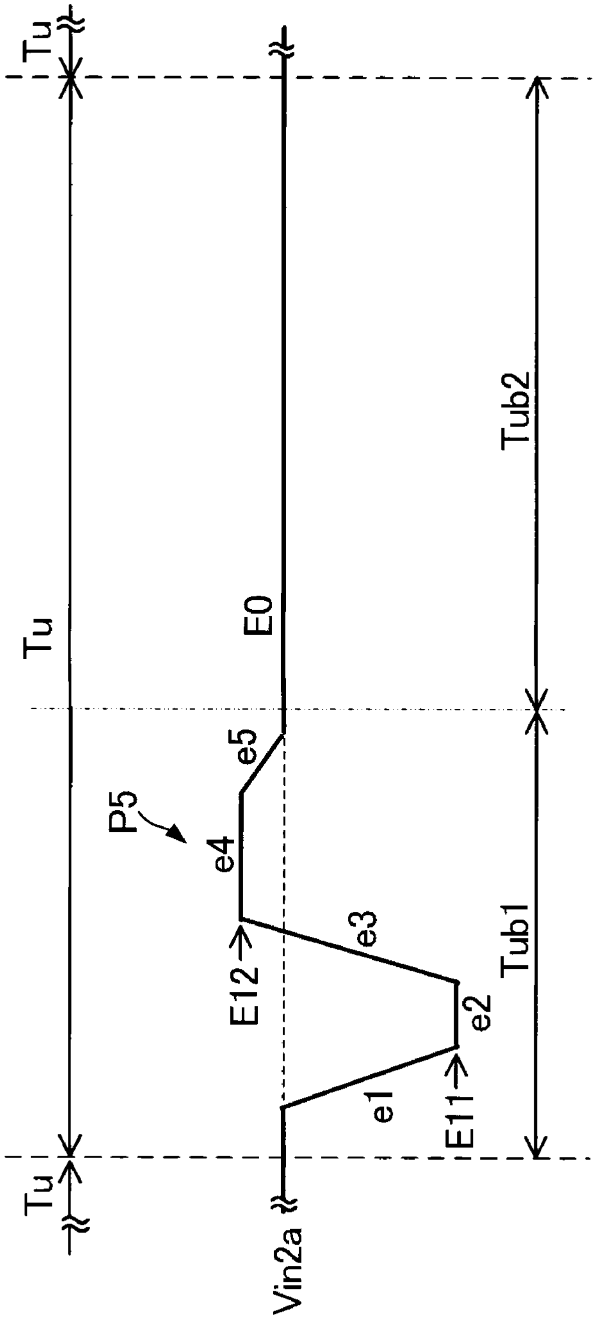
FIG. 14 is a diagram illustrating a second dot drive signal in the second embodiment.

FIG. 14 is a diagram illustrating the second dot drive signal Vin2*a* in the second embodiment. As illustrated in FIG. 14, the second dot drive signal Vin2*a* is generated by selecting the second ejection pulse P5 of the second common drive signal ComBa during a single driving cycle Tu. In the present embodiment, unlike the first embodiment, the second dot drive signal Vin2*a* does not include the vibration imparting pulse P3.

The second ejection pulse P5 includes a filling element e1, a maintained element e2, an ejection element e3, a maintained element e4, and a damping element e5. The filling element e1 is an element that changes the electrical potential to drive the drive element 51*f* so as to generate negative pressure in the pressure chamber C. The filling element e1 changes in electrical potential from the reference electrical potential E0 to an electrical potential E11 lower than the reference electrical potential E0. The electrical potential E11 is the lowest electrical potential of the voltage of the second ejection pulse P5. The maintained element e2 is an element that maintains the electrical potential E11. The ejection element e3 is an element that changes the electrical potential to drive the drive element 51*f* so as to generate positive pressure in the pressure chamber C such that a droplet DR is ejected from the nozzle N. The ejection element e3 changes in electrical potential from the electrical potential E11 to an electrical potential E12 higher than the reference electrical potential E0. The electrical potential E12 is the highest electrical potential of the voltage of the second ejection pulse P5. The maintained element e4 is an element that maintains the electrical potential E12. The damping element e5 is an element that drives the drive element 51*f* so as to generate positive pressure in the pressure chamber C. The damping element e5 changes in electrical potential from the electrical potential E12 to the reference electrical potential E0. The time period of the maintained element e4 is set such that the residual vibration is reduced by generating negative pressure by the damping element b5 at a timing at which the pressure remaining in the ink in the ejection section 510 after the ejection element e3 is positive pressure. The damping element e5 is an element that returns from the electrical potential E12 other than the reference electrical potential E0 to the reference electrical potential E0.

By supplying the second dot drive signal Vin2*a* to the drive element 51*f* during the single driving cycle Tu, the second dot which is a medium dot can be printed on the medium M.

As illustrated in FIG. 13, the time period ta1 of the filling element a1 of the first ejection pulse P1 in the first common drive signal ComAa overlaps the time period te1 of the filling element e1 of the second ejection pulse P5 in the second common drive signal ComBa. The time period ta3 of the ejection element a3 of the first ejection pulse P1 in the first common drive signal ComAa overlaps the time period te3 of the ejection element e3 of the second ejection pulse P5 in the second common drive signal ComBa.

The time period ta1 of the filling element a1 and the time period te1 of the filling element e1 overlap each other, and the time period ta3 of the ejection element a3 and the time period te3 of the ejection element e3 overlap each other. Therefore, when the first dot is ejected from one of two adjacent ejection sections 510 and the second dot is ejected from the other of the two adjacent ejection sections 510, interference due to fluctuations in the pressure in the two adjacent ejection sections 510 can be suppressed.

The case where the time period ta1 of the filling element a1 overlaps the time period te1 of the filling element e1 includes not only a case where the time periods ta1 and te1 completely overlap each other but also a case where the time periods ta1 and te1 partially overlap each other. Similarly, the case where the time period ta3 of the ejection element a3 overlaps the time period te3 of the ejection element e3 includes not only a case where the time periods ta3 and te3 completely overlap each other but also a case where the time periods ta3 and te3 partially overlap each other. However, the larger the degree of overlapping of the two time periods is, the more remarkably the above-described effect is exhibited.

Figure 15:
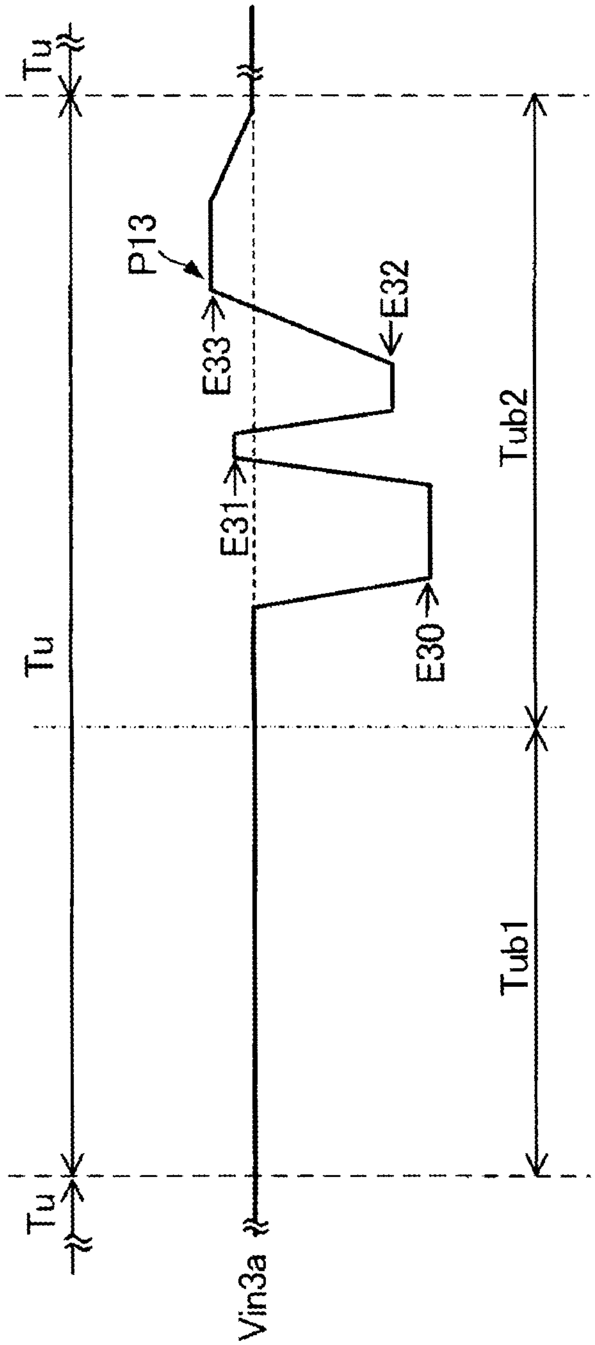
FIG. 15 is a diagram illustrating a third dot drive signal in the second embodiment.

FIG. 15 is a diagram illustrating the third dot drive signal Vin3*a* in the second embodiment. As illustrated in FIG. 15, the third dot drive signal Vin3*a* is generated by selecting the ejection pulse P13 of the second common drive signal ComBa during the single driving cycle Tu. In the present embodiment, the third dot which is a small dot is formed by a droplet DR based on the ejection pulse P13.

The ejection pulse P13 pressurizes and depressurizes the ink in the pressure chamber C to cause the pressure applied to the liquid in the pressure chamber C to fluctuate such that the ink is ejected from the nozzle N.

The ejection pulse P13 changes in electrical potential from the reference electrical potential E0 to an electrical potential E30 lower than the reference electrical potential E0, maintains the electrical potential E30, then changes in electrical potential from the electrical potential E30 to an electrical potential E31 higher than the reference electrical potential E0, and maintains the electrical potential E31. Thereafter, the ejection pulse P13 changes in electrical potential from the electrical potential E31 to an electrical potential E32 lower than the reference electrical potential E0, maintains the electrical potential E32, and then changes in electrical potential from the electrical potential E32 to an electrical potential E33 higher than the reference electrical potential E0. Thereafter, after the electrical potential E33 is maintained, the ejection pulse P13 changes in electrical potential so as to return from the electrical potential E33 to the reference electrical potential E0. The third dot is ejected while the ejection pulse P13 changes in electrical potential from the electrical potential E30 to the electrical potential E31 and then changes in electrical potential from the electrical potential E31 to the electrical potential E32.

The third dot which is a small dot can be printed on the medium M by supplying the third dot drive signal Vin3*a* to the drive element 51*f* during the single driving cycle Tu.

C. Third Embodiment

A third embodiment of the present disclosure will be described below. In the embodiment described below, elements having the same operational effects and functions as those described in the first embodiment are denoted by the same reference signs as those used in the description of the first embodiment, and detailed description thereof is omitted as appropriate.

Figure 16:
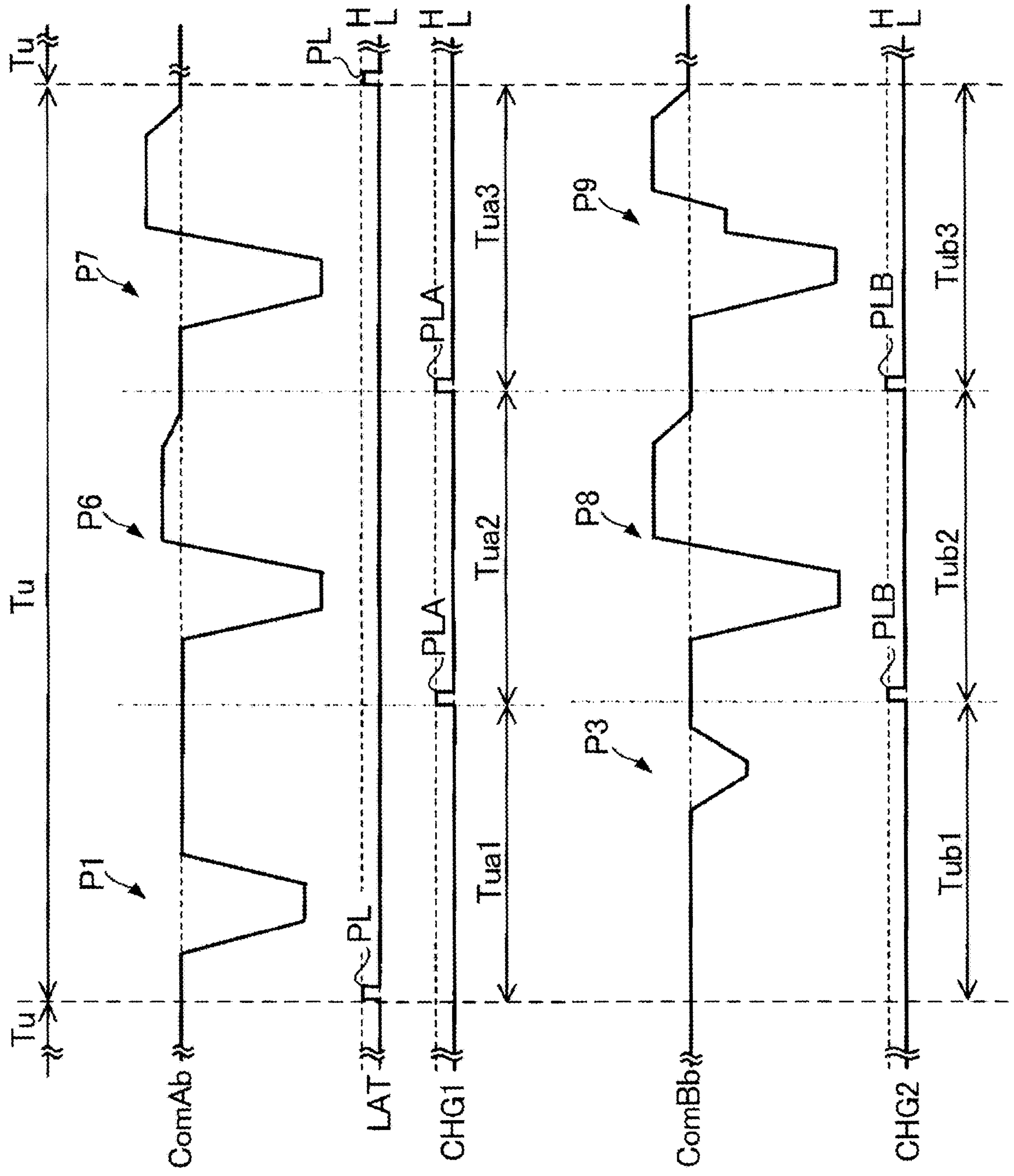
FIG. 16 is a diagram for explaining drive signals used in a third embodiment.

FIG. 16 is a diagram for explaining a common drive signal Com used in the third embodiment. As illustrated in FIG. 13, the common drive signal Com in the present embodiment includes a first common drive signal ComAb and a second common drive signal ComBb.

The first common drive signal ComAb includes a first ejection pulse P1, a next ejection pulse P6 that follows the first ejection pulse P1, and a last ejection pulse P7 in this order. The first ejection pulse P1 is provided in a control period Tua1. The next ejection pulse P6 is provided in a control period Tua2. The last ejection pulse P7 is provided in a control period Tua3. The second common drive signal ComBb includes a vibration imparting pulse P3, a second ejection pulse P8, and an ejection pulse P9. The vibration imparting pulse P3 is provided in a control period Tub1. The second ejection pulse P8 is provided in a control period Tub2. The ejection pulse P9 is provided in a control period Tub3.

A first dot drive signal Vin1*b*, a second dot drive signal Vin2*b*, and a third dot drive signal Vin3*b* are formed by appropriately selecting the pulses included in the first common drive signal ComAb and the second common drive signal ComBb.

Figure 17:
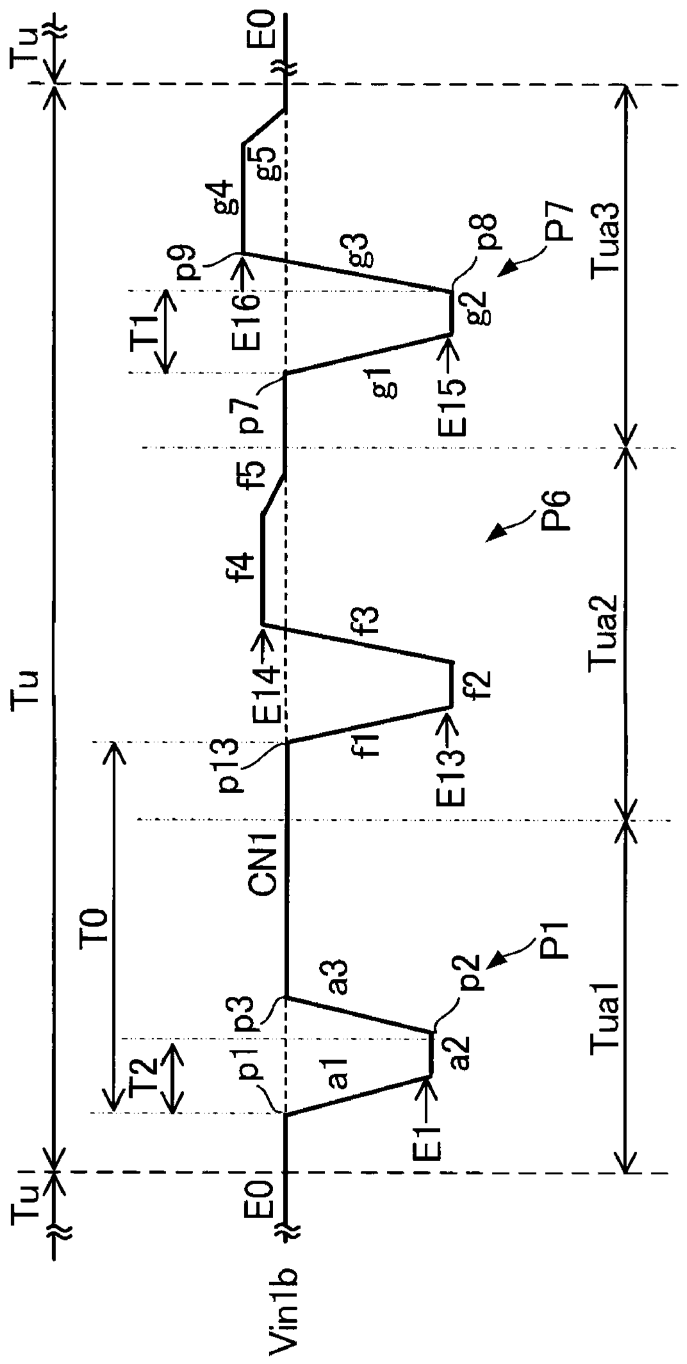
FIG. 17 is a diagram illustrating a first dot drive signal in the third embodiment.

FIG. 17 is a diagram illustrating the first dot drive signal Vin1*b* in the third embodiment. As illustrated in FIG. 17, the first dot drive signal Vin1*b* has the same waveform shape as that of the first common drive signal ComAb, and includes a first ejection pulse P1, a next ejection pulse P6 that follows the first ejection pulse P1, and a last ejection pulse P7. A combined droplet DRA is formed by three droplets DR, which are a droplet DR based on the first ejection pulse P1, a droplet DR based on the next ejection pulse P6, and a droplet DR based on the last ejection pulse P7.

The first ejection pulse P1 is a trapezoidal wave and has a filling element a1, a maintained element a2, and an ejection element a3 in this order. Similarly to the first embodiment, the pulse width T2 of the first ejection pulse P1 is preferably greater than or equal to 0.3 TC and less than 0.5 TC, or greater than or equal to 0.5 TC and less than 0.7 TC.

The next ejection pulse P6 is in the second position in chronological order among the plurality of ejection pulses P included in the first dot drive signal Vin1*b*. The next ejection pulse P6 includes a filling element f1, a maintained element f2, an ejection element f3, a maintained element f4, and a damping element f5 in this order.

The filling element f1 is an element that changes the electrical potential to drive the drive element 51*f* so as to generate negative pressure in the pressure chamber C. The filling element f1 changes in electrical potential from the reference electrical potential E0 to an electrical potential E13 lower than the reference electrical potential E0. The electrical potential E13 is the lowest electrical potential of the voltage of the next ejection pulse P6. The maintained element f2 is an element that maintains the electrical potential E13. The ejection element f3 is an element that changes the electrical potential to drive the drive element 51*f* so as to generate positive pressure in the pressure chamber C such that a droplet DR is ejected from the nozzle N. The ejection element f3 changes in electrical potential from the electrical potential E13 to an electrical potential E14 higher than the reference electrical potential E0. The electrical potential E14 is the highest electrical potential of the voltage of the next ejection pulse P6. The maintained element f4 is an element that maintains the electrical potential E14. The damping element f5 is an element that drives the drive element 51*f* so as to generate negative pressure in the pressure chamber C. The damping element f5 changes in electrical potential from the electrical potential E14 to the reference electrical potential E0. The time period of the maintained element f4 is set such that the residual vibration is reduced by generating negative pressure by the damping element f5 at a timing at which the pressure remaining in the ink in the ejection section 510 after the ejection element f3 is positive pressure. The damping element f5 is an element that returns from the electrical potential E14 other than the reference electrical potential E0 to the reference electrical potential E0.

The last ejection pulse P7 includes a filling element g1, a maintained element g2, an ejection element g3, a maintained element g4, and a damping element g5 in this order.

The filling element g1 is an element that changes the electrical potential to drive the drive element 51*f* so as to generate negative pressure in the pressure chamber C. The filling element g1 changes in electrical potential from the reference electrical potential E0 to an electrical potential E15 lower than the reference electrical potential E0. The electrical potential E15 is the lowest electrical potential of the voltage of the last ejection pulse P7. The maintained element g2 is an element that maintains the electrical potential E15. The ejection element g3 is an element that changes the electrical potential to drive the drive element 51*f* so as to generate positive pressure in the pressure chamber C such that a droplet DR is ejected from the nozzle N. The ejection element g3 changes in electrical potential from the electrical potential E15 to an electrical potential E16 higher than the reference electrical potential E0. The electrical potential E16 is the highest electrical potential of the voltage of the last ejection pulse P7. The maintained element g4 is an element that maintains the electrical potential E16. The damping element g5 is an element that drives the drive element 51*f* so as to generate negative pressure in the pressure chamber C. The damping element g5 changes in electrical potential from the electrical potential E16 to the reference electrical potential E0. The time period of the maintained element g4 is set such that the residual vibration is reduced by generating negative pressure by the damping element g5 at a timing at which the pressure remaining in the ink in the ejection section 510 after the ejection element g3 is positive pressure.

The first dot which is a large dot can be printed on the medium M by supplying the first dot drive signal Vin1*b* to the drive element 51*f* during a single driving cycle Tu. As described above, the large dot is formed by the combined droplet DRA obtained by combining the three droplets DR based on the three ejection pulses P1, P6, and P7.

Also in the present embodiment, similarly to the first embodiment, a time period T1 from the start p7 of the filling element g1 of the last ejection pulse P7 to the start p8 of the ejection element g3 of the last ejection pulse P7 is greater than or equal to 0.3 TC and less than 0.5 TC. By setting the time period T1 within the above-described range, it is possible to reduce a variation in the landing positions of the ink ejected from the plurality of ejection sections 510, compared to a case where the time period T1 is out of the range. In addition, the amount of ink to be ejected can be increased by the residual vibration.

In the first dot drive signal Vin1*b*, a first pulse interval TO which is a time interval from the start p1 of the filling element a1 of the first ejection pulse P1 to the start p13 of the filling element of the next ejection pulse P6 in chronological order is greater than or equal to 1.7 TC and less than 2.7 TC. Therefore, since the first pulse interval T0 is within the above-described range, it is possible to increase the amount of the droplet DR to be ejected based on the next ejection pulse P6 due to the residual vibration caused by the first ejection pulse P1, compared to a case where the first pulse interval T0 is out of the range. Before the droplet DR based on the next ejection pulse P6 lands on the medium M, the droplet DR based on the next ejection pulse P6 and the droplet DR based on the first ejection pulse P1 are easily combined. The electrical potential change range of the ejection element g3 of the last ejection pulse P7 is greater than the electrical potential change range of the ejection element f3 of the next ejection pulse P6, the flying speed of the droplet DR based on the last ejection pulse P7 is faster than the flying speed of the droplet DR based on the next ejection pulse P6, and all the droplets DR are easily combined before the droplets DR land on the medium M.

Figure 18:
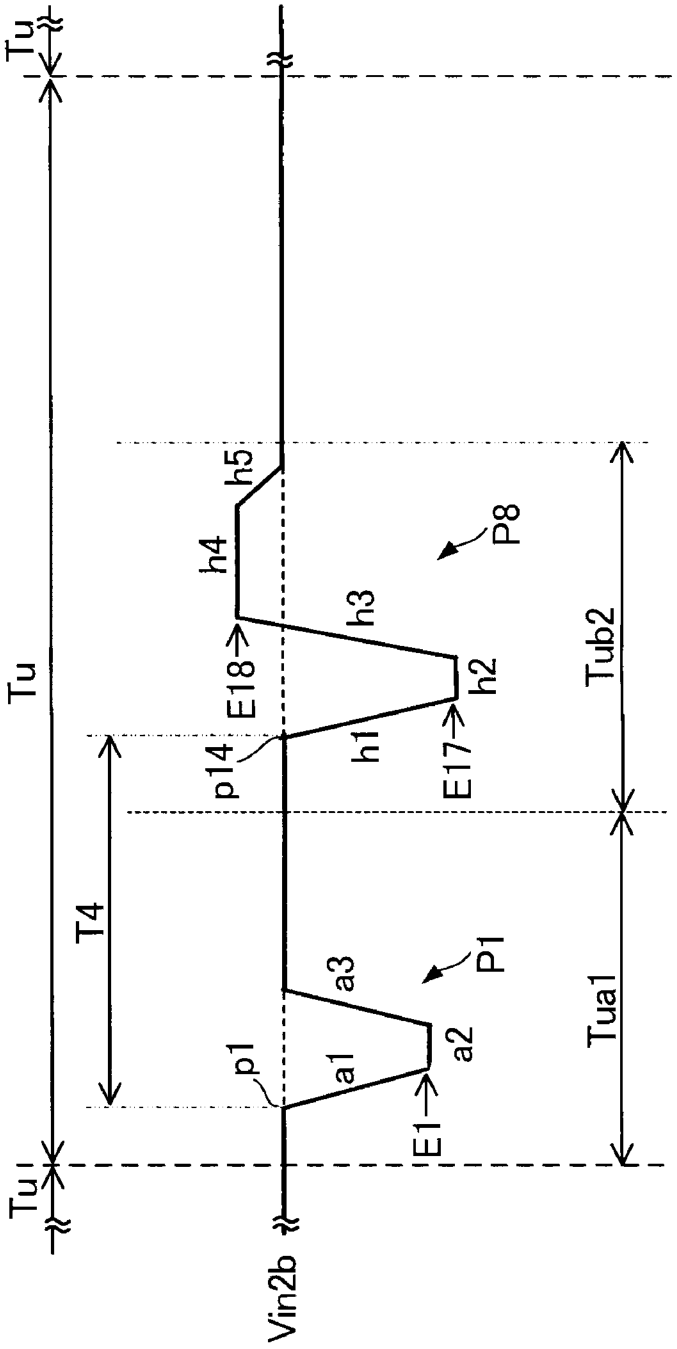
FIG. 18 is a diagram illustrating a second dot drive signal in the third embodiment.

FIG. 18 is a diagram illustrating the second dot drive signal Vin2*b* in the third embodiment. As illustrated in FIG. 18, the second dot drive signal Vin2*b* includes the first ejection pulse P1 and the second ejection pulse P8 in this order. The second dot drive signal Vin2*b* is generated by selecting the first ejection pulse P1 of the first common drive signal ComAb and the second ejection pulse P8 of the second common drive signal ComBb. In the present embodiment, a combined droplet DRA is formed by two droplets DR which are a droplet DR based on the first ejection pulse P1 and a droplet DR based on the second ejection pulse P8. Therefore, in the present embodiment, the second dot which is a medium dot is formed by the combined droplet DRA.

The second ejection pulse P8 includes a filling element h1, a maintained element h2, an ejection element h3, a maintained element h4, and a damping element h5 in this order.

The filling element h1 is an element that changes the electrical potential to drive the drive element 51*f* so as to generate negative pressure in the pressure chamber C. The filling element h1 changes in electrical potential from the reference electrical potential E0 to an electrical potential E17 lower than the reference electrical potential E0. The electrical potential E17 is the lowest voltage of the voltage of the second ejection pulse P8. The maintained element h2 is an element that maintains the electrical potential E17. The ejection element h3 is an element that changes the electrical potential to drive the drive element 51*f* so as to generate positive pressure in the pressure chamber C such that a droplet DR is ejected from the nozzle N. The ejection element h3 changes in electrical potential from the electrical potential E17 to an electrical potential E18 higher than the reference electrical potential E0. The electrical potential E18 is the highest electrical potential of the voltage of the second ejection pulse P8. The maintained element h4 is an element that maintains the electrical potential E18. The damping element h5 is an element that drives the drive element 51*f* so as to generate positive pressure in the pressure chamber C. The damping element h5 changes in electrical potential from the electrical potential E18 to the reference electrical potential E0. The time period of the maintained element h4 is set such that the residual vibration is reduced by generating negative pressure by the damping element h5 at a timing at which the pressure remaining in the ink in the ejection section 510 after the ejection element h3 is positive pressure. The damping element h5 is an element that returns from the electrical potential E18 other than the reference electrical potential E0 to the reference electrical potential E0.

By supplying the second dot drive signal Vin2*b* to the drive element 51*f* during the single driving cycle Tu, the second dot which is a medium dot can be printed on the medium M.

Also in the present embodiment, similarly to the first embodiment, pulses necessary for forming different dots are dispersed to a plurality of common drive signals Com, and some pulses are used in common for forming different dots, whereby the length of a single driving cycle can be shortened and gradation expression can be performed by high-frequency driving. As described above, each of the first dot drive signal Vin1*b* and the second dot drive signal Vin2*b* includes the first ejection pulse P1 of the first common drive signal ComAb. Therefore, even when a dot of any size is to be formed, it is easy to combine a droplet DR based on the first ejection pulse P1 and a droplet DR based on the next ejection pulse P by using the first ejection pulse P1 which is a trapezoidal wave. In the second dot drive signal Vin2*b*, the pulse to be combined with the first ejection pulse P1 of the first common drive signal ComAb is set to the second ejection pulse P8 of the second common drive signal ComBb that is not selected for the first dot drive signal Vin1*b*, and thus the amount of the second dot to be ejected can be easily adjusted by adjusting the pulse shape of the second ejection pulse P8 regardless of the amount of the first dot to be ejected.

In the second dot drive signal Vin2*b*, a pulse interval T4 which is a time interval from the start p1 of the filling element a1 of the first ejection pulse P1 to the start p14 of the filling element h1 of the second ejection pulse P8 is greater than or equal to 1.7 TC and less than 2.7 TC. Since the pulse interval T4 is within the above-described range, it is easy to combine the droplets DR1 and DR2 before the droplet DR2 lands on the medium M while securing the amount of the droplet DR2 to be ejected, due to the residual vibration caused by the first ejection pulse P1, compared to a case where the pulse interval T4 is out of the range.

The first pulse interval TO of the first dot drive signal Vin1*b* described above is greater than or equal to 1.7 TC and less than 2.7 TC. Since the first pulse interval TO and the pulse interval T4 are within the above-described range, when the first dot is ejected from one of two adjacent ejection sections 510 and the second dot is ejected from the other of the two adjacent ejection sections 510, interference due to fluctuations in the pressure in the two adjacent ejection sections 510 can be suppressed, compared to a case where the first pulse interval TO and the pulse interval T4 are out of the range.

Figure 19:
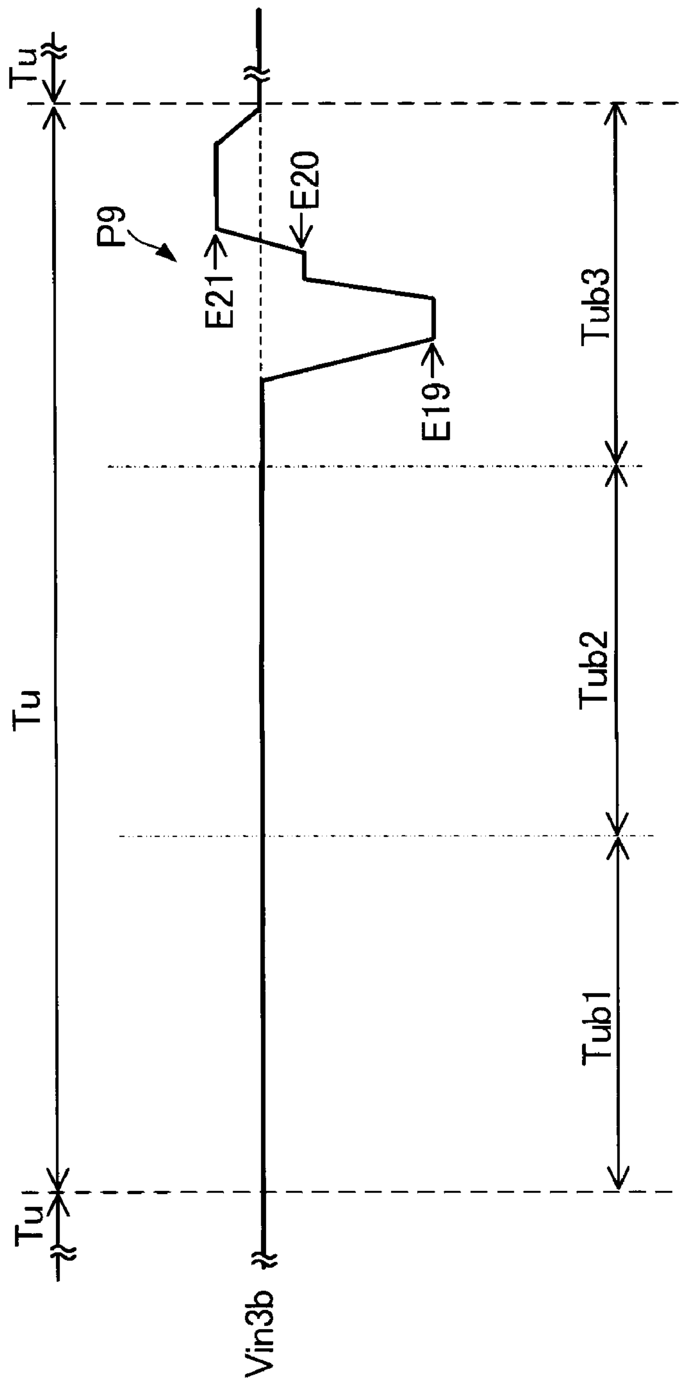
FIG. 19 is a diagram illustrating a third dot drive signal in the third embodiment.

FIG. 19 is a diagram illustrating the third dot drive signal Vin3*b* in the third embodiment. As illustrated in FIG. 19, the third dot drive signal Vin3*b* includes the ejection pulse P9. The third dot drive signal Vin3*b* is generated by selecting the ejection pulse P9 of the second common drive signal ComBb. In the present embodiment, the third dot which is a small dot is formed by a droplet DR based on the ejection pulse P9.

The ejection pulse P9 pressurizes and depressurizes the ink in the pressure chamber C to cause the pressure applied to the liquid in the pressure chamber C to fluctuate such that the ink is ejected from the nozzle N.

The ejection pulse P9 changes in electrical potential from the reference electrical potential E0 to an electrical potential E19 lower than the reference electrical potential E0, maintains the electrical potential E19, then changes in electrical potential to an electrical potential E20 higher than the electrical potential E19 and lower than the reference electrical potential E0, and maintains the electrical potential E20. Thereafter, the ejection pulse P9 changes in electrical potential from the electrical potential E20 to an electrical potential E21 higher than the reference electrical potential E0, maintains the electrical potential E21, and then changes in electrical potential so as to return to the reference electrical potential E0. The third dot is ejected while the ejection pulse P9 changes in electrical potential from the electrical potential E19 to the electrical potential E21.

The third dot which is a small dot can be printed on the medium M by supplying the third dot drive signal Vin3*b* to the drive element 51*f* during the single driving cycle Tu.

D. Fourth Embodiment

A fourth embodiment of the present disclosure will be described below. In the embodiment described below, elements having the same operational effects and functions as those described in the first embodiment are denoted by the same reference signs as those used in the description of the first embodiment, and detailed description thereof is omitted as appropriate.

Figure 20:
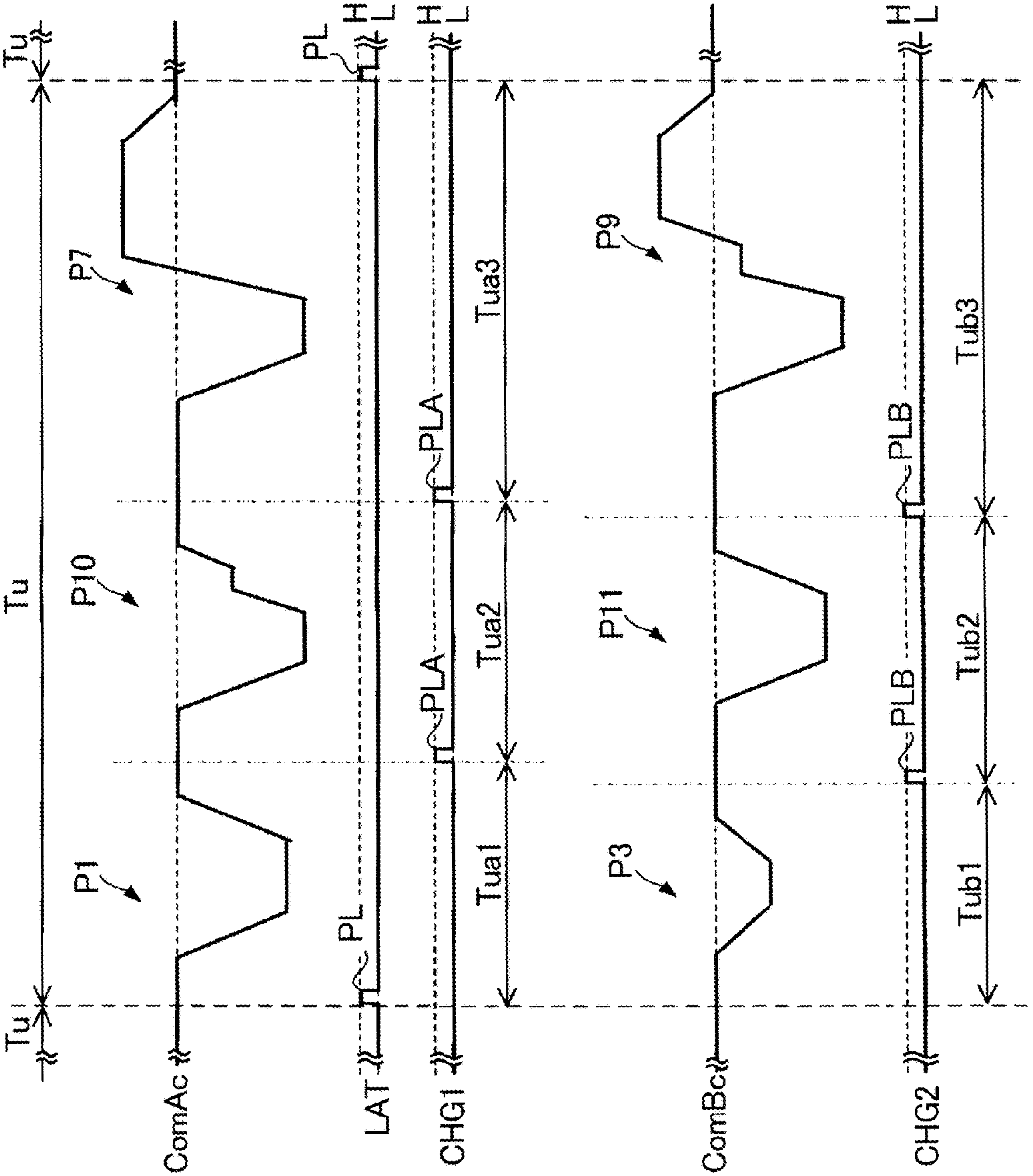
FIG. 20 is a diagram for explaining drive signals used in a fourth embodiment.

FIG. 20 is a diagram for explaining a common drive signal Com used in the fourth embodiment. As illustrated in FIG. 20, the common drive signal Com in the present embodiment includes a first common drive signal ComAc and a second common drive signal ComBc.

The first common drive signal ComAc includes a first ejection pulse P1, a next ejection pulse P10 that follows the first ejection pulse, and a last ejection pulse P7 in this order. The first ejection pulse P1 is provided in a control period Tua1. The next ejection pulse P10 is provided in a control period Tua2. The last ejection pulse P7 is provided in a control period Tua3. The second common drive signal ComBc includes a vibration imparting pulse P3, a second ejection pulse P11, and an ejection pulse P9. The vibration imparting pulse P3 is provided in a control period Tub1. The second ejection pulse P11 is provided in a control period Tub2. The ejection pulse P9 is provided in a control period Tub3.

A first dot drive signal Vin1*c*, a second dot drive signal Vin2*c*, and a third dot drive signal Vin3*b* are formed by appropriately selecting the pulses included in the first common drive signal ComAc and the second common drive signal ComBc. The third dot drive signal Vin3*b* is the same as that described in the third embodiment, and the waveform of the third dot drive signal Vin3*b* is as illustrated in FIG. 19.

Figure 21:
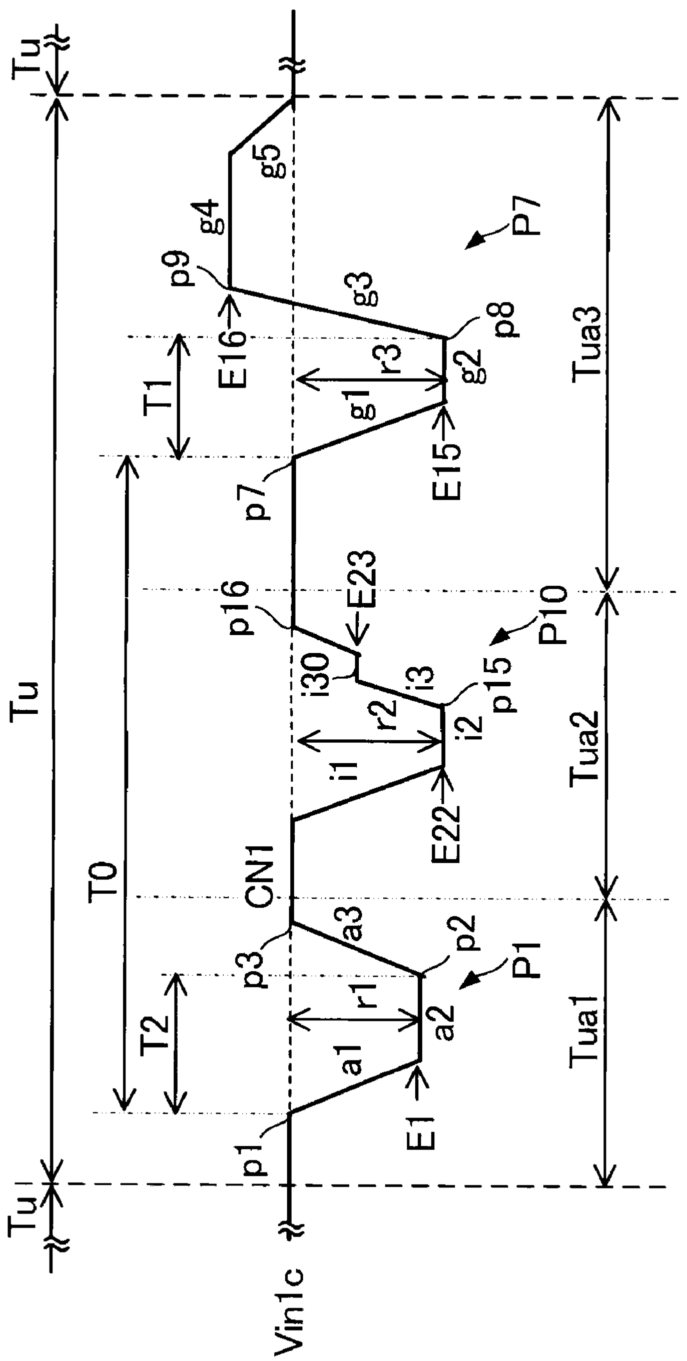
FIG. 21 is a diagram illustrating a first dot drive signal in the fourth embodiment.

FIG. 21 is a diagram illustrating the first dot drive signal Vin1*c* in the fourth embodiment. As illustrated in FIG. 21, the first dot drive signal Vin1*c* has the same waveform shape as that of the first common drive signal ComAc, and includes a first ejection pulse P1, a next ejection pulse P10 that follows the first ejection pulse, and a last ejection pulse P7. A combined droplet DRA is formed by three droplets DR, which are a droplet DR based on the first ejection pulse P1, a droplet DR based on the next ejection pulse P10, and a droplet DR based on the last ejection pulse P7.

The first ejection pulse P1 is a trapezoidal wave and has a filling element a1, a maintained element a2, and an ejection element a3 in this order. Similarly to the first embodiment, the pulse width T2 of the first ejection pulse P1 is preferably greater than or equal to 0.3 TC and less than 0.5 TC, or greater than or equal to 0.5 TC and less than 0.7 TC.

The next ejection pulse P10 is the second position pulse in chronological order among the plurality of ejection pulses P included in the first dot drive signal Vin1*c*. The next ejection pulse P10 includes a filling element i1, a maintained element i2, and an ejection element i3 in this order.

The filling element i1 is an element that changes the electrical potential to drive the drive element 51*f* so as to generate negative pressure in the pressure chamber C. The filling element i1 changes in electrical potential from the reference electrical potential E0 to an electrical potential E22 lower than the reference electrical potential E0. The electrical potential E22 is the lowest electrical potential of the voltage of the next ejection pulse P10. The maintained element i2 is an element that maintains the electrical potential E22. The ejection element i3 is an element that changes the electrical potential to drive the drive element 51*f* so as to generate positive pressure in the pressure chamber C such that the ink is ejected from the nozzle N. The ejection element i3 changes in electrical potential from the electrical potential E22 to the reference electrical potential E0. The ejection element i3 includes an element that changes in electrical potential from the electrical potential E22 to an electrical potential E23 which is between the reference electrical potential E0 and the electrical potential E22, and a damping element i30 that maintains the electrical potential E23 and then changes in electrical potential from the electrical potential E23 to the reference electrical potential E0. A time period for which the electrical potential E23 is maintained is set such that the residual vibration is reduced by generating positive pressure by a change in the electrical potential from the electrical potential E23 to the reference electrical potential E0 at a timing at which the pressure remaining in the ink in the ejection section 510 after the electrical potential changes from the electrical potential E22 to the electrical potential E23 is negative pressure. The last ejection pulse P7 is as described in the third embodiment, and has the filling element g1, the maintained element g2, the ejection element g3, the maintained element g4, and the damping element g5 in this order.

The first dot which is a large dot can be printed on the medium M by supplying the first dot drive signal Vin1*c* to the drive element 51*f* during a single driving cycle Tu. The large dot is formed by the combined droplet DRA obtained by combining the three droplets DR based on the three ejection pulses P.

Also in the present embodiment, similarly to the first embodiment, a time period T1 from the start p7 of the filling element g1 of the last ejection pulse P7 to the start p8 of the ejection element g3 of the last ejection pulse P7 is greater than or equal to 0.3 TC and less than 0.5 TC. By setting the time period T1 within the above-described range, it is possible to reduce a variation in the landing positions of the ink ejected from the plurality of ejection sections 510, compared to a case where the time period T1 is out of the range. In addition, the amount of ink to be ejected can be increased by the residual vibration.

The ejection element i3 included in the next ejection pulse P10 which is a predetermined ejection pulse among the plurality of ejection pulses included in the first common drive signal ComAc includes the damping element i30. During a change in the electrical potential from the starting electrical potential of the start p15 of the ejection element i3 to the ending electrical potential of the ending edge p16 of the ejection element i3, the damping element i30 maintains the electrical potential E23 between the starting electrical potential and the ending electrical potential, and then changes in electrical potential from the electrical potential E23 to the reference electrical potential E0. Since the damping element i30 is included, it is possible to suppress the dropping speed of the droplet DR caused by the next ejection pulse P10 and suitably perform the damping adjustment on the residual vibration caused by the next ejection pulse P10, compared to a case where the damping element i30 is not included. Accordingly, the combined droplet DRA is easily formed, and it is possible to suppress the instability of the ejection by the last ejection pulse P7.

The waveform shape of the next ejection pulse of the first dot drive signal Vin1*c* in the fourth embodiment is different from the waveform shape of the next ejection pulse of the first dot drive signal Vin1*b* in the third embodiment. Since the first dot drive signal Vin1*c* in the fourth embodiment has the next ejection pulse P10, the first dot can be ejected with a shorter waveform length than the waveform length of the first dot drive signal Vin1*b* in the third embodiment.

In addition, the rate r1 of change in the electrical potential of the filling element a1 of the first ejection pulse P1 is lower than the rates of change in the electrical potentials of the filling elements i1 and g1 of the ejection pulses P other than the first ejection pulse P1. Specifically, the rate r1 of change in the electrical potential is lower than each of the rate r2 of change in the electrical potential of the filling element i1 of the next ejection pulse P10 and the rate r3 of change in the electrical potential of the filling element g1 of the last ejection pulse P7. Since the rate r1 of change in the electrical potential is lowered in this way, even when the residual vibration in the previous cycle remains, it is possible to suppress the instability of the ejection by the first ejection pulse P1 in the current cycle.

Figure 22:
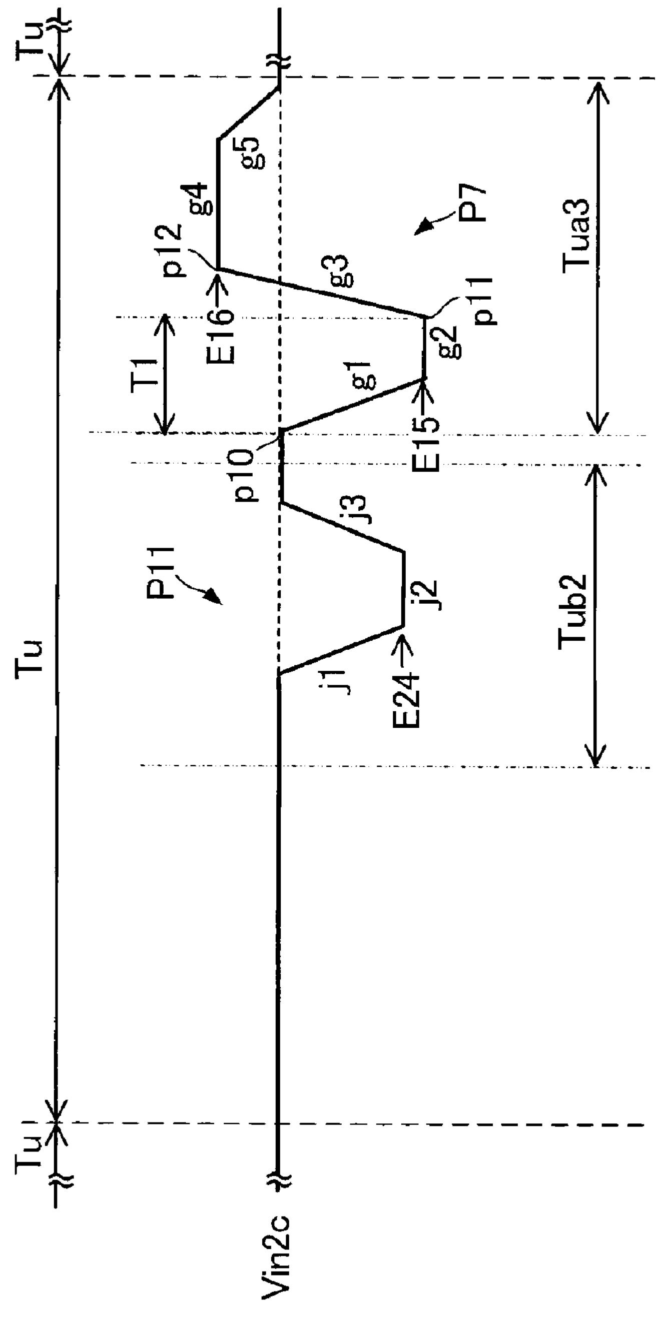
FIG. 22 is a diagram illustrating a second dot drive signal in the fourth embodiment.

FIG. 22 is a diagram illustrating the second dot drive signal Vin2*c* in the fourth embodiment. As illustrated in FIG. 22, the second dot drive signal Vin2*c* includes the second ejection pulse P11 and the last ejection pulse P7 in this order. The second dot drive signal Vin2*c* is generated by selecting the second ejection pulse P11 of the second common drive signal ComBc and the last ejection pulse P7 of the first common drive signal ComAc. In the present embodiment, a combined droplet DRA is formed by two droplets DR which are a droplet DR based on the second ejection pulse P11 and a droplet DR based on the last ejection pulse P7. Therefore, in the present embodiment, the second dot which is a medium dot is formed by the combined droplet DRA.

The second ejection pulse P11 is a trapezoidal wave and includes a filling element j1, a maintained element j2, and an ejection element j3 in this order.

The filling element j1 is an element that changes the electrical potential to drive the drive element 51*f* so as to generate negative pressure in the pressure chamber C. The filling element j1 changes in electrical potential from the reference electrical potential E0 to a fourth electrical potential E24 lower than the reference electrical potential E0. The fourth electrical potential E24 is the lowest electrical potential of the voltage of the second ejection pulse P11. The maintained element j2 is an element that maintains the fourth electrical potential E24. The ejection element j3 is an element that changes the electrical potential to drive the drive element 51*f* so as to generate positive pressure in the pressure chamber C such that a droplet DR is ejected from the nozzle N. The ejection element j3 changes in electrical potential from the fourth electrical potential E24 to the reference electrical potential E0.

The last ejection pulse P7 is as described in the third embodiment, and has the filling element g1, the maintained element g2, the ejection element g3, the maintained element g4, and the damping element g5 in this order.

By supplying the second dot drive signal Vin2*c* to the drive element 51*f* during the single driving cycle Tu, the second dot which is a medium dot can be printed on the medium M.

Also in the present embodiment, similarly to the first embodiment, pulses necessary for forming different dots are dispersed to a plurality of common drive signals Com, and some pulses are used in common for forming different dots, whereby the length of a single driving cycle can be shortened and gradation expression can be performed by high-frequency driving. In addition, as described above, by using the last ejection pulse P7 of the first common drive signal ComAc in common for each of the first dot drive signal Vin1*c* and the second dot drive signal Vin2*c*, it is easy to align the landing positions of the first dot and the second dot. In the second dot drive signal Vin2*c*, the pulse to be combined with the last ejection pulse P7 of the first common drive signal ComAc is the second ejection pulse P11 of the second common drive signal ComBc that is not selected for the first dot drive signal Vin1*c*. Therefore, the amount of the second dot to be ejected relative to the amount of the first dot to be ejected can be easily adjusted by adjusting the pulse shape of the second ejection pulse P11 regardless of the amount of the first dot to be ejected.

E. Modifications

Each of the above-described embodiments can be variously modified. Specific modifications that can be applied to each of the above-described embodiments will be described below. Two or more aspects randomly selected from the following examples can be combined as appropriate to the extent that these aspects do not contradict each other.

In the above-described embodiments, the number of ejection pulses P in a driving cycle Tu may be four or more. For example, a third common drive signal may be used in addition to the first common drive signal ComA and the second common drive signal ComB. The number of common drive signals Com to be used is not limited to two.

The widths of the nozzles N in each of the above-described embodiments may be the same or may be different in stages, for example. Further, the configuration of the head chip 51 is not limited to the example illustrated in FIG. 3, and is arbitrary.

In each of the above-described embodiments, the serial type liquid ejecting apparatus 100 that causes the carriage 41 on which the head 50 is mounted to reciprocate is exemplified, but the present disclosure is also applied to a line type liquid ejecting apparatus provided with a plurality of nozzles N that are distributed over the entire width of the medium M.

The liquid ejecting apparatus 100 described in each of the above-described embodiments may be used in not only an apparatus dedicated for printing but also various apparatuses such as a facsimile machine and a copy machine, and the application of the present disclosure is not particularly limited. However, the application of the liquid ejecting apparatus is not limited to printing. For example, a liquid ejecting apparatus that ejects a solution of a coloring material is used as a manufacturing apparatus that forms a color filter for a display device such as a liquid crystal display panel. In addition, a liquid ejecting apparatus that ejects a solution of a conductive material is used as a manufacturing apparatus that forms a wiring or an electrode for a wiring substrate. Further, a liquid ejecting apparatus that ejects a solution of an organic substance related to a living body is used, for example, as a manufacturing apparatus that manufactures a biochip.

F. Reference Example

Figure 23:
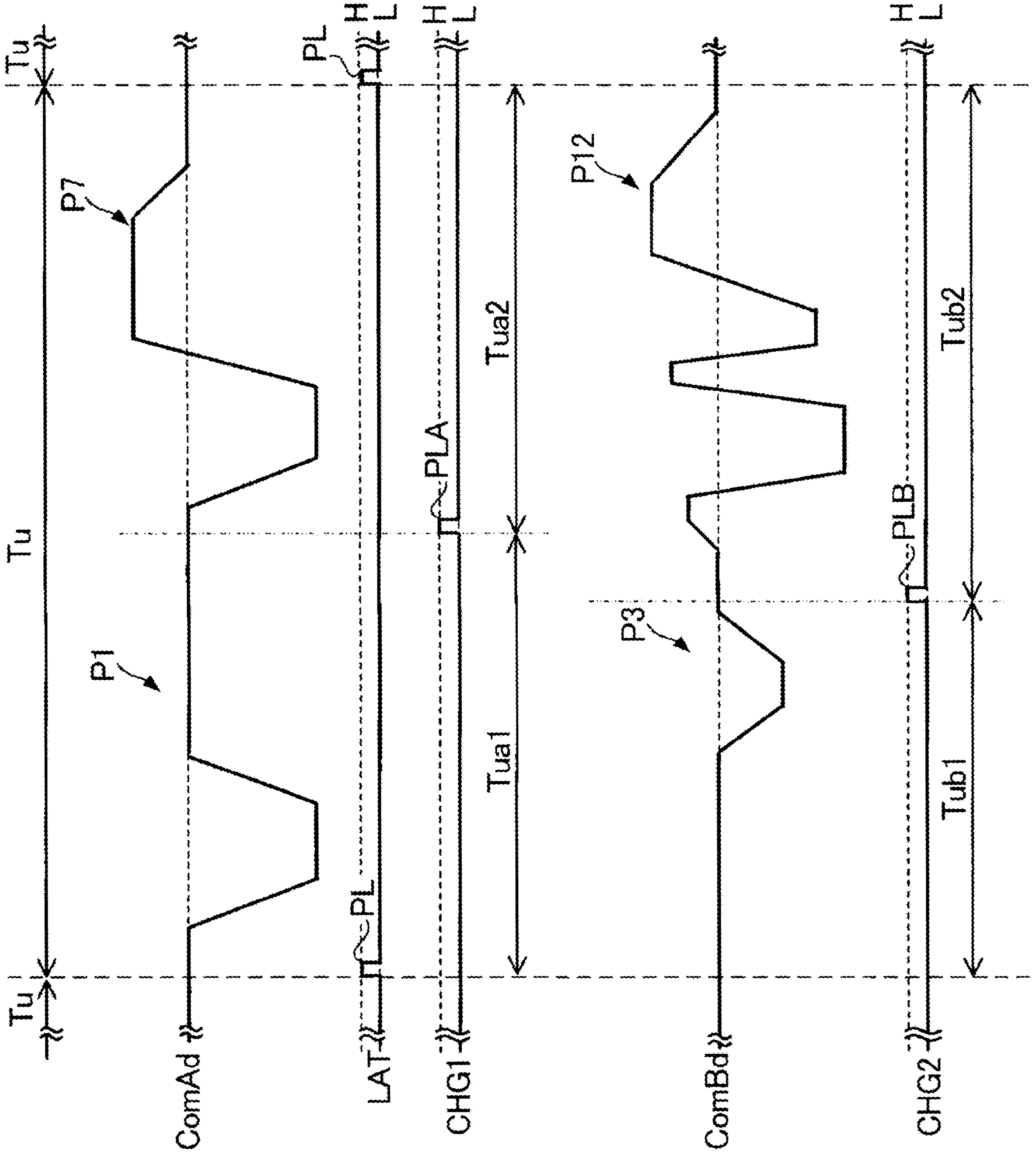
FIG. 23 is a diagram for explaining drive signals in a reference example.

FIG. 23 is a diagram for explaining a common drive signal Com in a reference example. As illustrated in FIG. 23, a first common drive signal ComAd in the reference example includes a first ejection pulse P1 and a last ejection pulse P7 in this order in a driving cycle Tu. The first ejection pulse P1 is provided in a control period Tua1. The last ejection pulse P7 is provided in a control period Tua2.

A second common drive signal ComBd in the reference example includes a vibration imparting pulse P3 and an ejection pulse P12 in this order. The vibration imparting pulse P3 is provided in a control period Tub1. The ejection pulse P12 is provided in a control period Tub2.

By generating a supply signal Vin by appropriately combining pulses selected from the first common drive signal ComAd and the second common drive signal ComBd in the driving cycle Tu, it is possible to eject, from each of the nozzles N, dots having different sizes that are a first dot which is a large dot, a second dot which is a medium dot, and a third dot which is a small dot.

Figure 24:
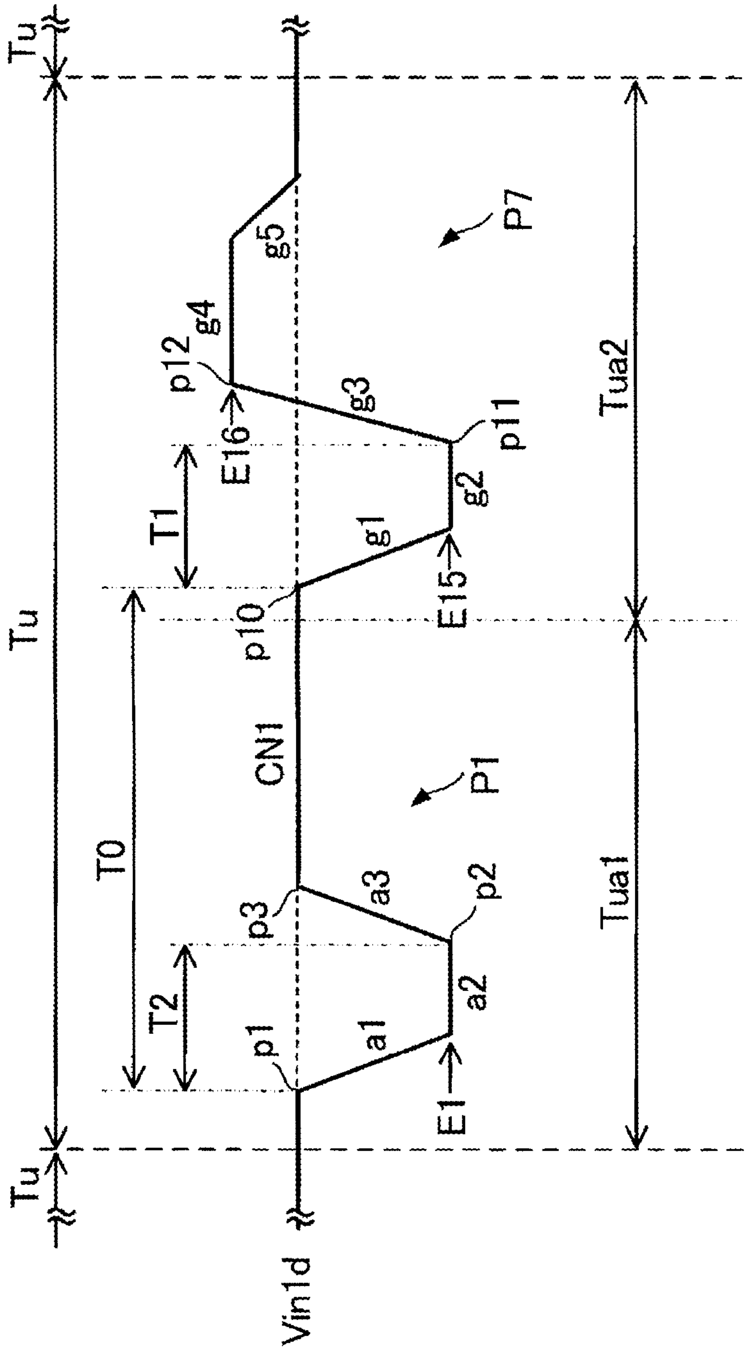
FIG. 24 is a diagram illustrating a first dot drive signal in the reference example.

FIG. 24 is a diagram illustrating a first dot drive signal Vin1*d* in the reference example. As illustrated in FIG. 24, the first dot drive signal Vin1*d* has the same waveform shape as that of the first common drive signal ComAd, and includes the first ejection pulse P1 and the last ejection pulse P7. The first dot drive signal Vin1*d* is generated by selecting the first ejection pulse P1 and the last ejection pulse P7 of the first common drive signal ComAd. The last ejection pulse P7 is also the next ejection pulse that follows the first ejection pulse in chronological order among the plurality of ejection pulses P. A first coupling element CN1 is provided between the first ejection pulse P1 and the last ejection pulse P7. The first coupling element CN1 maintains the reference electrical potential E0. The first ejection pulse P1 is as described in the first embodiment. The last ejection pulse P7 is as described in the third embodiment.

The first dot which is a large dot can be printed on the medium M by supplying the first dot drive signal Vin1*d* to the drive element 51*f* during a single driving cycle Tu.

Also in the reference example, similarly to each embodiment, since the first ejection pulse P1 which is a trapezoidal pulse is provided, it is possible to shorten the driving cycle Tu without excessively increasing the flying speed of the ink, compared to each ejection pulse Px illustrated in FIG. 28 according to the existing technique. Therefore, even when the time interval between the first ejection pulse P1 and the last ejection pulse P7 is narrowed by high-speed driving, droplets DR1 and DR2 are easily combined, and the instability of the ejection of ink can be reduced, as compared to the existing technique. In addition, since the first ejection pulse P1 which is a trapezoidal pulse causes a small amount of ink to be ejected and ink refilling is fast, compared to each ejection pulse Px of the so-called pull-push-pull waveform, it is advantageous from the viewpoint of securing the amount of ink to be ejected by the last ejection pulse P7.

Further, by setting the electrical potential change range of the last ejection pulse P7 to be wider than that of the first ejection pulse P1, it is possible to increase the amount of a droplet. Therefore, since the first dot drive signal Vin1*d* includes the first ejection pulse P1 and the last ejection pulse P7, it is possible to reduce the instability of the ejection of ink in high-speed driving while securing the amount of ink droplets.

In the reference example, a time period T1 from the start p10 of the filling element g1 of the last ejection pulse P7 to the start p11 of the ejection element g3 of the last ejection pulse P7 is greater than or equal to 0.5 TC and less than 0.75 TC. With the start of the filling element g1, the pressure applied to the ink in the ejection section 510 starts to change to negative pressure, and changes to positive pressure after 0.5 TC. By setting the time period T1 of the last ejection pulse P7 to be greater than or equal to 0.5 TC and less than 0.7 TC, it is possible to apply positive pressure by the ejection element g3 in synergy with the natural vibration generated in the ink in the ejection section 510. Therefore, by setting the time period T1 that is the pulse width of the last ejection pulse P7 within the above-described range, it is possible to suppress pressurization by the ejection element g3, suppress a satellite, and secure the stability of the ejection, compared to a case where the time period T1 is out of the above-described range. In addition, the amount of ink to be ejected can be increased.

A first pulse interval T0 is preferably greater than or equal to 1.7 TC and less than 2.7 TC. The first pulse interval T0 is a time period from the start p1 of the filling element a1 of the first ejection pulse P1 to the start p10 of the filling element g1 of the last ejection pulse P7 which is the next ejection pulse. When the first pulse interval T0 is within the above-described range, it is easy to combine the droplets DR1 and DR2 before the droplet DR1 caused by the first ejection pulse P1 lands on the medium M, while securing the amount of the droplet DR2 ejected by the next ejection pulse P7 due to the residual vibration caused by the first ejection pulse P1, compared to a case where the first pulse interval T0 is out of the range.

The pulse width T2 of the first ejection pulse P1 included in the first dot drive signal Vin1*d* is greater than or equal to 0.3 TC and less than 0.5 TC. The pulse width T2 is a time period from the start p1 of the filling element a1 of the first ejection pulse P1 to the start p2 of the ejection element a3. Since the pulse width T2 is within the above-described range, it is possible to shorten the entire waveform length while reducing variations in the flying speeds and weights of ink droplets to be ejected from the plurality of ejection sections 510, compared to a case where the pulse width T2 is out of the range. Therefore, it is particularly suitable for high-speed driving.

Figure 25:
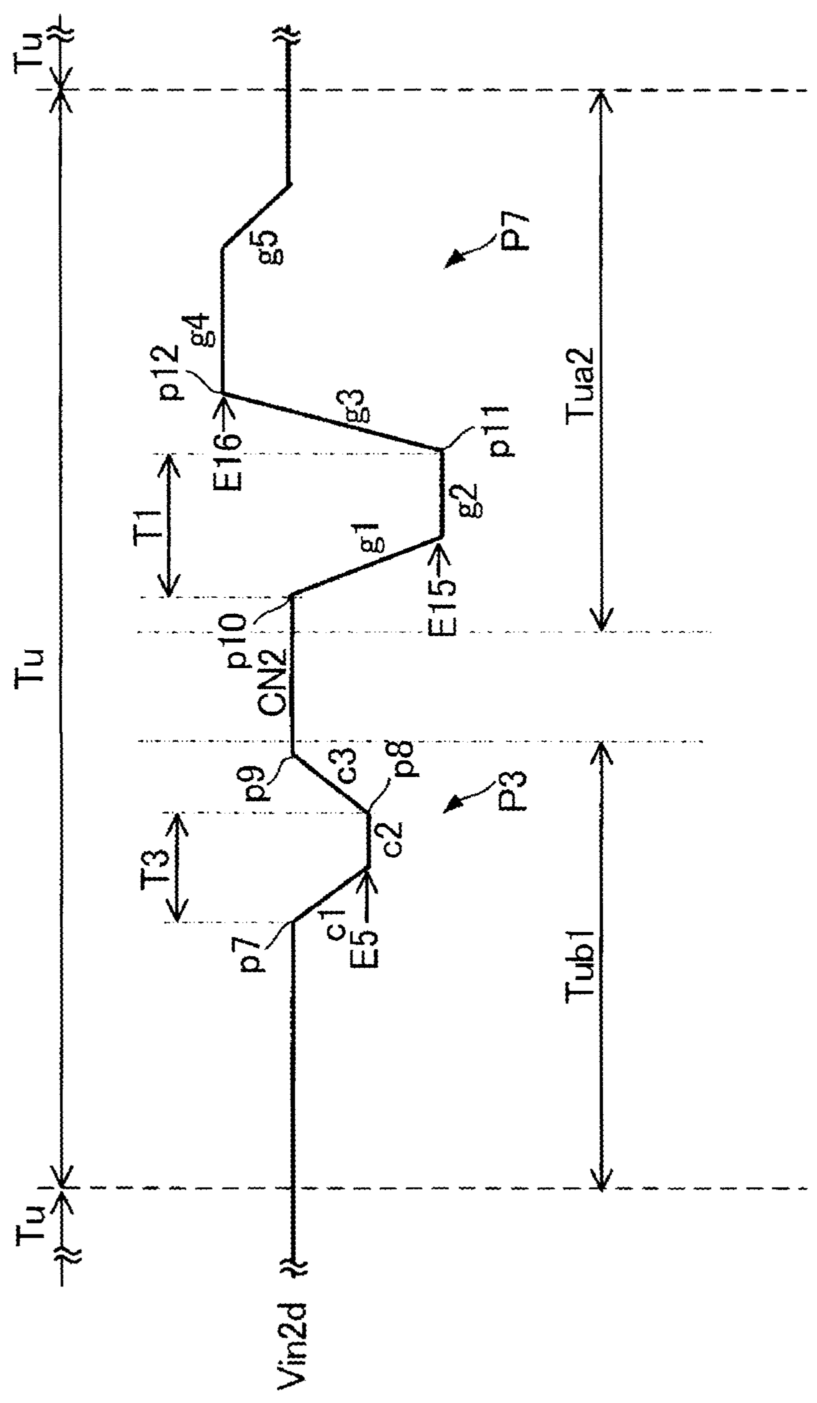
FIG. 25 is a diagram illustrating a second dot drive signal in the reference example.

FIG. 25 is a diagram illustrating a second dot drive signal Vin2*d* in the reference example. The second dot drive signal Vin2*d* includes the vibration imparting pulse P3 and the last ejection pulse P7. Specifically, the second dot drive signal Vin2*d* is generated by selecting the vibration imparting pulse P3 of the second common drive signal ComBd and the last ejection pulse P7 of the first common drive signal ComAd during the single driving cycle Tu. A second coupling element CN2 is provided between the vibration imparting pulse P3 and the last ejection pulse P7. The second coupling element CN2 maintains the reference electrical potential E0.

The vibration imparting pulse P3 is as described in the first embodiment. The last ejection pulse P7 is as described in the third embodiment.

By supplying the second dot drive signal Vin2*d* to the drive element 51*f* during the single drive cycle Tu, the second dot which is a medium dot can be printed on the medium M.

Figure 26:
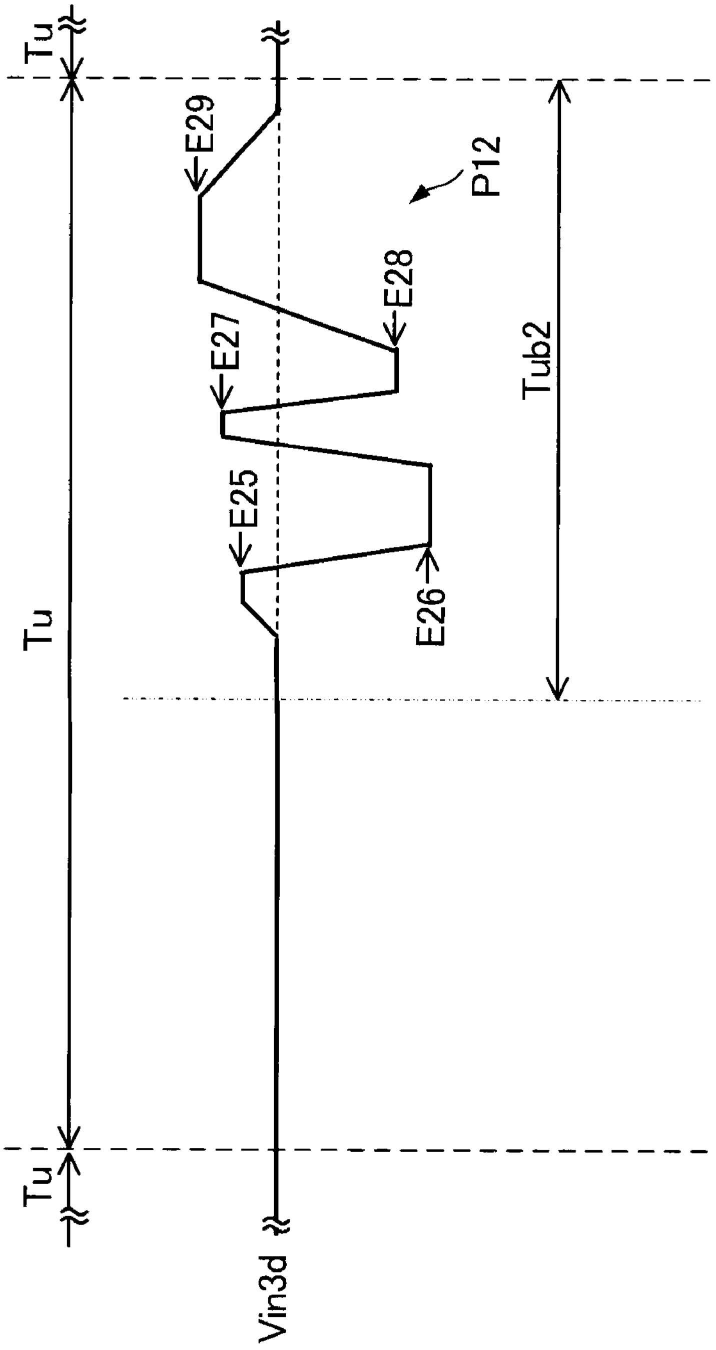
FIG. 26 is a diagram illustrating a third dot drive signal in the reference example.

FIG. 26 is a diagram illustrating a third dot drive signal Vin3*d* in the reference example. As illustrated in FIG. 26, the third dot drive signal Vin3*d* is generated by selecting the ejection pulse P12 of the second common drive signal ComBd during the single drive cycle Tu. The ejection pulse P12 pressurizes and depressurizes the ink in the pressure chamber C to cause the pressure applied to the liquid in the pressurize chamber C to fluctuate such that the ink is ejected from the nozzle N.

The ejection pulse P12 changes in electrical potential from the reference electrical potential E0 to an electrical potential E25 higher than the reference electrical potential E0, maintains the electrical potential E25, then changes in electrical potential to an electrical potential E26 lower than the reference electrical potential E0, and maintains the electrical potential E26. Thereafter, the ejection pulse P12 changes in electrical potential from the electrical potential E26 to an electrical potential E27 higher than the reference electrical potential E0, maintains the electrical potential E27, then changes in electrical potential to an electrical potential E28 lower than the reference electrical potential E0, and maintains the electrical potential E28. Thereafter, the ejection pulse P12 changes in electrical potential from the electrical potential E28 to an electrical potential E29 higher than the reference electrical potential E0, maintains the electrical potential E29, and then changes in electrical potential so as to return to the reference electrical potential E0. The third dot is ejected while the ejection pulse P12 changes in electrical potential from the electrical potential E26 to the electrical potential E27 and then changes in electrical potential from the electrical potential E27 to the electrical potential E28.

The third dot which is a small dot can be printed on the medium M by supplying the third dot drive signal Vin3*d* to the drive element 51*f* during the single driving cycle Tu.

G. Another Reference Example

Figure 27:
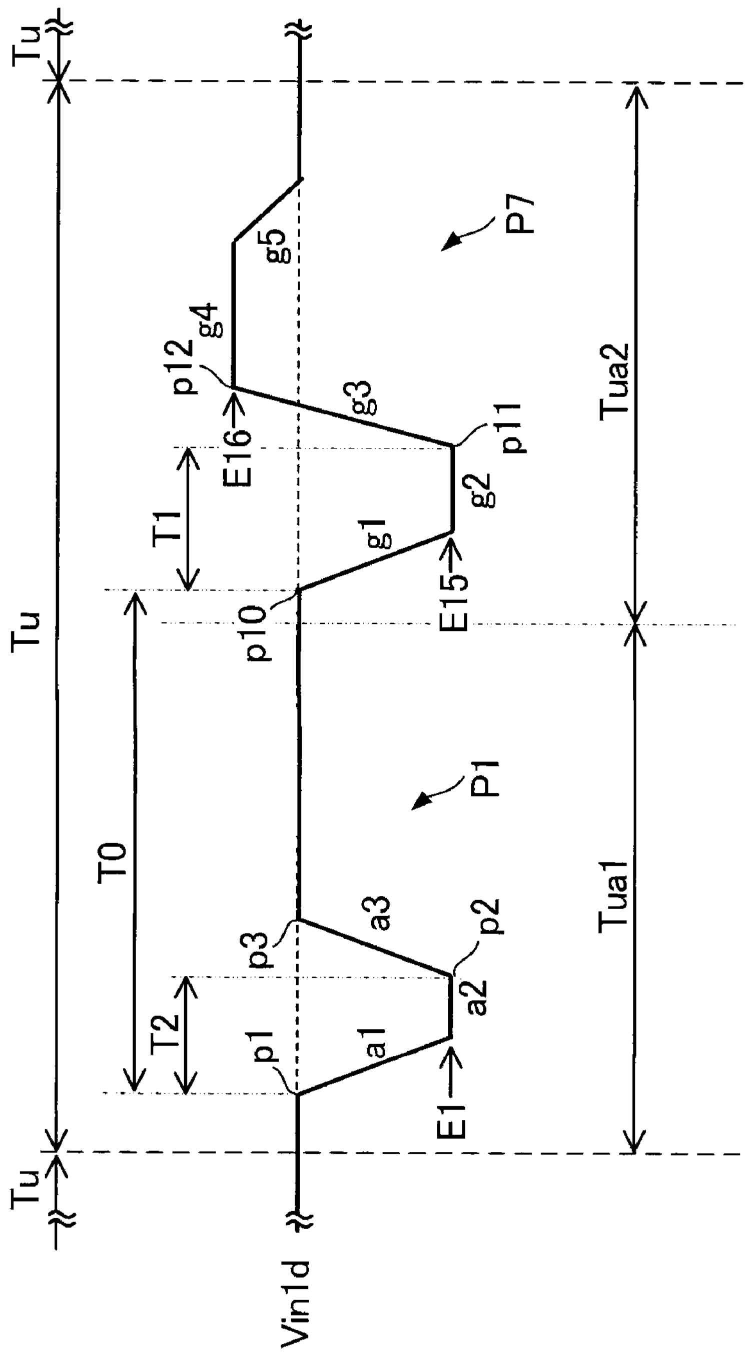
FIG. 27 is a diagram illustrating a first dot drive signal in another reference example.

FIG. 27 is a diagram illustrating a first dot drive signal Vin1*d* in another reference example. In the first dot drive signal Vin1*d* in the other reference example illustrated in FIG. 27, a preferable range of the pulse width T2 of the first ejection pulse P1 is different from the range in the reference example described above.

Specifically, the pulse width T2 of the first ejection pulse P1 included in the first dot drive signal Vin1*d* in the other reference example is greater than or equal to 0.5 TC and less than 0.7 TC. With the start of the filling element a1, the pressure applied to the ink in the ejection section 510 starts to change to negative pressure, and changes to positive pressure after 0.5 TC. By setting the pulse width T2 of the first ejection pulse P1 to be greater than or equal to 0.5 TC and less than 0.7 TC, it is possible to apply positive pressure by the ejection element a3 in synergy with the natural vibration occurring in the ink in the ejection section 510. Therefore, since the pulse width T2 of the first ejection pulse P1 is within the above-described range, it is possible to suppress pressurization by the ejection element a3 and suppress the speed of the first ejection pulse P1, compared to a case where the pulse width T2 is out of the range. Therefore, it is possible to stabilize the ejection. Since the pulse width T2 of the first ejection pulse P1 is within the above-described range, it is easy to secure the weight of a droplet DR1 caused by the first ejection pulse P1, compared to a case where the pulse width T2 is out of the range.

What is claimed is:

1. A liquid ejecting apparatus comprising:

an ejection section that includes a nozzle from which liquid is ejected onto a medium, a pressure chamber communicating with the nozzle, and a drive element that is configured to cause pressure applied to the liquid in the pressure chamber to fluctuate when a drive signal is supplied to the drive element; and a drive signal generator that is configured to generate the drive signal, wherein the drive signal includes a first common drive signal including a plurality of ejection pulses corresponding to a plurality of droplets that are combined before the droplets land on the medium, the plurality of ejection pulses include filling elements that change an electrical potential to drive the drive element so as to generate negative pressure in the pressure chamber, and ejection elements that change the electrical potential to drive the drive element to generate positive pressure in the pressure chamber such that a droplet is ejected from the nozzle, an ejection element of a first ejection pulse in chronological order among the plurality of ejection pulses changes in electrical potential from a first electrical potential to a reference electrical potential and is coupled to a first coupling element, a filling element of a last ejection pulse in chronological order among the plurality of ejection pulses changes in electrical potential from an electrical potential equal to or higher than the reference electrical potential to a second electrical potential, and an ejection element of the last ejection pulse changes in electrical potential from the second electrical potential to a third electrical potential, the last ejection pulse includes a damping element that changes in electrical potential after the ejection element of the last ejection pulse so as to reduce a fluctuation in the pressure in the pressure chamber, the reference electrical potential is between the first electrical potential and the third electrical potential, the reference electrical potential is between the second electrical potential and the third electrical potential, a time period from start of the filling element of the last ejection pulse to start of the ejection element of the last ejection pulse is greater than or equal to 0.3 TC and less than 0.5 TC, and TC indicates a natural vibration period of the ejection section.

2. The liquid ejecting apparatus according to claim 1, wherein the first coupling element is an element that maintains the reference electrical potential until start of a next ejection pulse that follows the first ejection pulse in chronological order among the plurality of ejection pulses, and a first pulse interval from start of a filling element of the first ejection pulse to start of a filling element of the next ejection pulse is greater than or equal to 1.7 TC and less than 2.7 TC.

3. The liquid ejecting apparatus according to claim 1, wherein a pulse width of the first ejection pulse is greater than or equal to 0.5 TC and less than 0.7 TC.

4. The liquid ejecting apparatus according to claim 1, wherein a pulse width of the first ejection pulse is greater than or equal to 0.3 TC and less than 0.5 TC.

5. The liquid ejecting apparatus according to claim 1, wherein the drive signal includes a second common drive signal including a vibration imparting pulse that changes the electrical potential to drive the drive element so as to pressurize and depressurize the liquid in the pressure chamber to cause the pressure applied to the liquid in the pressure chamber to fluctuate without ejecting the liquid from the nozzle, a first dot is printed on the medium by supplying, to the drive element, a first dot drive signal generated by selecting the first ejection pulse and the last ejection pulse of the first common drive signal during a single driving cycle of the drive signal, a second dot smaller than the first dot is printed on the medium by supplying, to the drive element, a second dot drive signal generated by selecting the vibration imparting pulse of the second common drive signal and the last ejection pulse of the first common drive signal during the single driving cycle of the drive signal, in the first dot drive signal, a first pulse interval that is a time interval from a starting edge of a filling element of the first ejection pulse to a starting edge of the filling element of the last ejection pulse is greater than or equal to 1.7 TC and less than 2.7 TC, and in the second dot drive signal, a time period of a second coupling element that couples an ending edge of the vibration imparting pulse and a starting edge of the ejection element of the last ejection pulse is greater than or equal to 0.3 TC and less than 0.5 TC.

6. The liquid ejecting apparatus according to claim 1, wherein the drive signal includes a second common drive signal including a second ejection pulse including a filling element that changes the electrical potential to drive the drive element so as to generate negative pressure in the pressure chamber, and an ejection element that changes the electrical potential to drive the drive element so as to generate positive pressure in the pressure chamber such that a droplet is ejected from the nozzle, a first dot is printed on the medium by supplying, to the drive element, a first dot drive signal generated by selecting the first ejection pulse and the last ejection pulse of the first common drive signal during a single driving cycle of the drive signal, a second dot smaller than the first dot is printed on the medium by supplying, to the drive element, a second dot drive signal generated by selecting the second ejection pulse of the second common drive signal during the single driving cycle of the drive signal, in the first dot drive signal, a first pulse interval that is a time interval from a starting edge of a filling element of the first ejection pulse to a starting edge of the filling element of the last ejection pulse is greater than or equal to 1.7 TC and less than 2.7 TC, and a time period of the filling element of the first ejection pulse included in the first common drive signal overlaps a time period of the filling element of the second ejection pulse included in the second common drive signal, and a time period of the ejection element of the first ejection pulse included in the first common drive signal overlaps a time period of the ejection element of the second ejection pulse included in the second common drive signal.

7. The liquid ejecting apparatus according to claim 1, wherein the drive signal includes a second common drive signal including a second ejection pulse including a filling element that changes the electrical potential to drive the drive element so as to generate negative pressure in the pressure chamber, and a ejection element that changes the electrical potential to drive the drive element so as to generate positive pressure in the pressure chamber such that a droplet is ejected from the nozzle, a first dot is printed on the medium by supplying, to the drive element, a first dot drive signal generated by selecting the plurality of ejection pulses of the first common drive signal during a single driving cycle of the drive signal, a second dot smaller than the first dot is printed on the medium by supplying, to the drive element, a second dot drive signal generated by selecting the first ejection pulse of the first common drive signal and the second ejection pulse of the second common drive signal during the single driving cycle of the drive signal, in the first dot drive signal, a pulse interval that is a time interval from a starting edge of a filling element of the first ejection pulse to a starting edge of a filling element of a next ejection pulse that follows the first ejection pulse in chronological order among the plurality of ejection pulses is greater than or equal to 1.7 TC and less than 2.7 TC, and in the second dot drive signal, a pulse interval that is a time interval from the starting edge of the filling element of the first ejection pulse to a starting edge of the filling element of the second ejection pulse is greater than or equal to 1.7 TC and less than 2.7 TC.

8. The liquid ejecting apparatus according to claim 1, wherein the drive signal includes a second common drive signal including a second ejection pulse including a filling element that changes the electrical potential from the reference electrical potential to a fourth electrical potential to drive the drive element so as to generate negative pressure in the pressure chamber, and a ejection element that changes the electrical potential from the fourth electrical potential to the reference electrical potential to drive the drive element so as to generate positive pressure in the pressure chamber such that a droplet is ejected from the nozzle, a first dot is printed on the medium by supplying, to the drive element, a first dot drive signal generated by selecting the plurality of ejection pulses of the first common drive signal during a single driving cycle of the drive signal, and a second dot smaller than the first dot is printed on the medium by supplying, to the drive element, a second dot drive signal generated by selecting the second ejection pulse of the second common drive signal and the last ejection pulse of the first common drive signal during the single driving cycle of the drive signal.

9. The liquid ejecting apparatus according to claim 8, wherein an ejection element included in a predetermined ejection pulse among the plurality of ejection pulses included in the first common drive signal includes a maintained element that maintains an electrical potential that is between a starting electrical potential and an ending electrical potential during a change in the electrical potential from the starting electrical potential to the ending electrical potential.

10. The liquid ejecting apparatus according to claim 8, wherein a rate of change in an electrical potential of a filling element of the first ejection pulse is lower than rates of change in electrical potentials of the filling elements of the ejection pulses other than the first ejection pulse.

* * * * *